United States Patent
Lee

(10) Patent No.: US 11,573,659 B2
(45) Date of Patent: Feb. 7, 2023

(54) ELECTRONIC DEVICE CONFIGURED TO DETECT INPUT

(71) Applicant: Samsung Display Co., Ltd., Yongin-si (KR)

(72) Inventor: Soongyu Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/365,357

(22) Filed: Jul. 1, 2021

(65) Prior Publication Data

US 2022/0137768 A1 May 5, 2022

(30) Foreign Application Priority Data

Oct. 29, 2020 (KR) .................. 10-2020-0142133

(51) Int. Cl.
*G06F 3/041* (2006.01)

(52) U.S. Cl.
CPC ...... *G06F 3/04162* (2019.05); *G06F 3/04166* (2019.05); *G06F 2203/04106* (2013.01)

(58) Field of Classification Search
CPC ....... G06F 2203/04106; G06F 3/04162; G06F 3/04166; G06F 3/041; G06F 3/03545; G06F 3/033
See application file for complete search history.

(56) References Cited

U.S. PATENT DOCUMENTS

| 10,185,415 | B2 | 1/2019 | Dekel |
| 10,439,753 | B2 | 10/2019 | Imanilov |
| 2019/0102021 | A1* | 4/2019 | Jang ............... G06F 3/03545 |
| 2019/0286253 | A1 | 9/2019 | Kwon et al. |

FOREIGN PATENT DOCUMENTS

| KR | 10-2016-0016278 A | 2/2016 |
| KR | 10-2019-0038026 A | 4/2019 |
| KR | 10-2019-0107901 A | 9/2019 |
| KR | 10-2019-0120906 A | 10/2019 |
| KR | 10-2020-0006805 A | 1/2020 |

* cited by examiner

*Primary Examiner* — Lisa S Landis
(74) *Attorney, Agent, or Firm* — Lewis Roca Rothgerber Christie LLP

(57) ABSTRACT

An electronic device includes: a display panel configured to display an image; an input sensor on the display panel; and a sensor controller configured to detect a first input by at least one of a plurality of input devices through the input sensor, and wherein the sensor controller is configured to detect the first input during an input detection frame, wherein the input detection frame includes a search section in which a plurality of search signals are provided to the input sensor, and wherein the plurality of search signals include two or more search signals capable of communicating through two or more different protocols, respectively.

20 Claims, 16 Drawing Sheets

ELECTRONIC DEVICE CONFIGURED TO DETECT INPUT

CROSS-REFERENCE TO RELATED APPLICATIONS

The present application claims priority to and the benefit of Korean Patent Application No. 10-2020-0142133 filed on Oct. 29, 2020, in the Korean Intellectual Property Office, the entire content of which is hereby incorporated herein by reference.

BACKGROUND

1. Field

Aspects of some embodiments of the present disclosure described herein relate to an electronic device.

2. Description of the Related Art

Multimedia electronic devices such as televisions, mobile phones, tablet computers, navigation devices, and game consoles generally have a display device for displaying images. Electronic devices may include an input sensor capable of providing a touch-based input method that enables a user to intuitively and conveniently input information or commands in addition to conventional input methods such as buttons, keyboards, and mice.

The input sensor may detect a touch or a pressure generated using a user's body. Meanwhile, there is an increasing demand for an electronic pen for a detailed touch input for a user who is familiar with information input using a writing instrument or a specific application program (e.g., an application program for sketching or drawing).

Accordingly, an input sensor applied to an electronic device is required to detect a variety of inputs such as an electronic pen input as well as a touch or pressure input using a user's body.

The above information disclosed in this Background section is only for enhancement of understanding of the background and therefore the information discussed in this Background section does not necessarily constitute prior art.

SUMMARY

Aspects of some embodiments of the present disclosure described herein relate to an electronic device, and for example, relate to an electronic device capable of communicating with input devices.

Aspects of some embodiments of the present disclosure include an electronic device capable of supporting a multi-protocol to enable communication with various types of input devices.

According to some embodiments of the present disclosure, an electronic device includes a display panel that displays an image, an input sensor on the display panel, and a sensor controller that detects a first input by at least one of a plurality of input devices through the input sensor.

According to some embodiments, the sensor controller detects the first input during an input detection frame, and the input detection frame includes a search section in which a plurality of search signals are provided to the input sensor. The plurality of search signals include two or more search signals capable of communicating through two or more different protocols, respectively.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
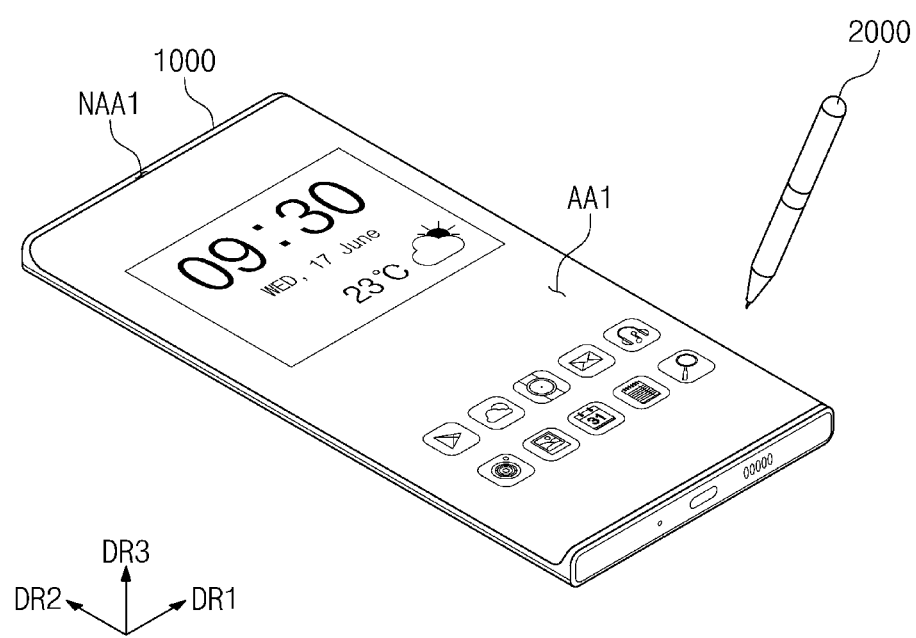
FIGS. 1 and 2 are perspective views illustrating an electronic device and an input device according to some embodiments of the present disclosure.

In the present specification, when an element (or region, layer, portion, etc.) is referred to as being "on", "connected", or "coupled" to another element, it means that it may be located on, connected or coupled directly to the other element, or a third element may be interposed between them.

The same reference numerals refer to the same elements. Also, in drawings, thicknesses, proportions, and dimensions of elements may be exaggerated to describe the technical features effectively.

The term "and/or" includes any and all combinations of one or more of the associated listed items.

Although the terms "first", "second", etc. may be used herein to describe various elements, such elements should not be construed as being limited by these terms. These terms are only used to distinguish one element from the other. For example, a first element may be referred to as a second element, without departing the scope of the present disclosure, and similarly, a second element may be referred to as a first element. Singular expressions include plural expressions unless the context clearly indicates otherwise.

In addition, terms such as "below", "lower", "above", and "upper" are used to describe the relationship between elements illustrated in the drawings. The terms are relative concepts, and are described based on the directions indicated in the drawings.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the present disclosure.

It will be understood that terms such as "comprise" or "have" specify the presence of features, numbers, steps, operations, elements, components, or combinations thereof described in the specification, but do not preclude the presence or additional possibility of one or more other features, numbers, steps, operations, elements, components, combinations thereof.

Hereinafter, embodiments of the present disclosure will be described with reference to accompanying drawings.

FIG. 1 is perspective view illustrating an electronic device and an input device according to some embodiments of the present disclosure.

Referring to FIG. 1, an electronic device 1000 may be a device that is activated based on an electrical signal. For example, the electronic device 1000 may be a mobile phone, a tablet, a car navigation system, a game console, or a wearable device, but is not particularly limited to any one thereof. FIG. 1 illustrates that the electronic device 1000 is a mobile phone, but embodiments according to the present disclosure are not limited thereto.

An active area AA1 and a peripheral area NAA1 may be defined in the electronic device 1000. The electronic device 1000 may display images at the active area AA1. The active area AA1 may include a surface defined by a first direction DR1 and a second direction DR2. The peripheral area NAA1 may surround the active area AA1.

A thickness direction of the electronic device 1000 may be parallel to a third direction DR3 crossing the first direction DR1 and the second direction DR2. Accordingly, a front surface (or upper surface) and a rear surface (or lower surface) of each of the members or components of the electronic device 1000 may be defined based on the third direction DR3.

The electronic device 1000 illustrated in FIG. 1 may detect an input by a user's touch and an input by an input device 2000. The input device 2000 may refer to a device other than the user's body. In FIG. 1, only one input device 2000 is illustrated, but the electronic device 1000 may detect inputs by a plurality of input devices. The input by the input device 2000 may be referred to as a first input. For example, the input device 2000 may be an active pen, a stylus pen, a touch pen, or an electronic pen. An input by a user's touch may be referred to as a second input. The second input may include various types of external inputs such as a part of the user's body, light, heat, or pressure.

The electronic device 1000 and the input device 2000 may perform bidirectional communication. The electronic device 1000 may provide a search signal to the input device 2000. The search signal is a signal for searching for the input device 2000. The search signal may be transmitted from the electronic device 1000 to the input device 2000, and in this case, the search signal may be referred to as an upward search signal. However, the search signal may be transmitted from the input device 2000 to the electronic device 1000. In this case, the electronic device 1000 may search for the input device 2000 through reception of the search signal, and this search signal may be referred to as a downward search signal. For example, the search signal may include, but embodiments according to the present disclosure are not limited to, a synchronization signal or information on the electronic device 1000.

When communication between the input device 2000 and the electronic device 1000 starts, the input device 2000 may provide a downlink signal to the electronic device 1000. The downlink signal may include the synchronization signal or state information of the input device 2000. For example, the downlink signal may include, but is not limited to, location information of the input device 2000, battery information of the input device 2000, tilt information of the input device 2000, and/or various information stored in the input device 2000.

Figure 2:
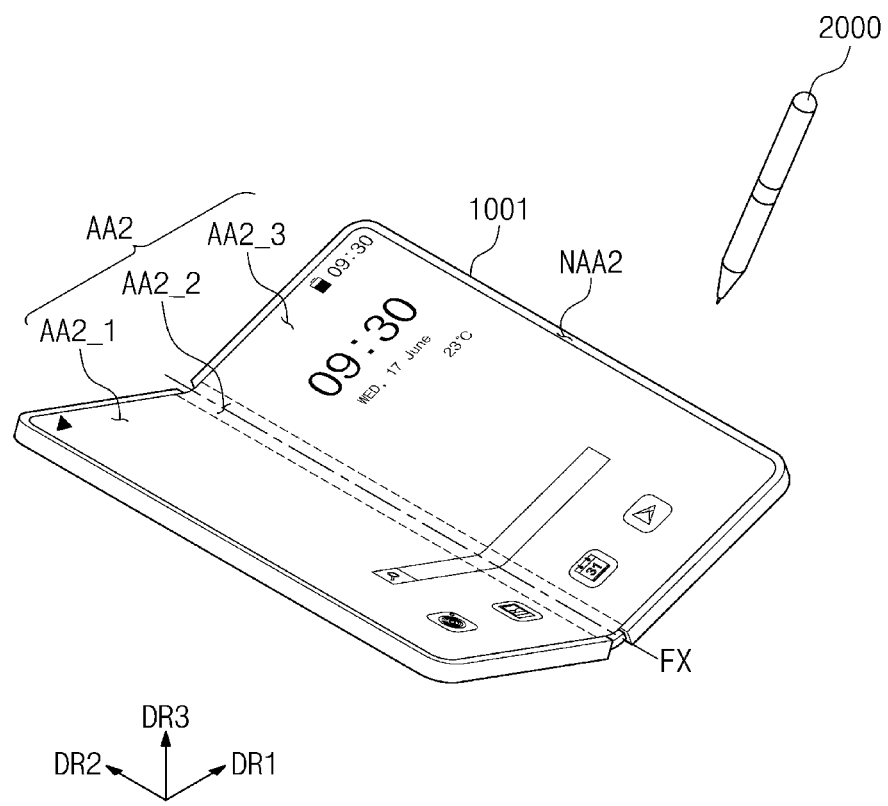

FIG. 2 is a perspective view illustrating an electronic device and an input device according to some embodiments of the present disclosure. In the description of FIG. 2, the same reference numerals are used for the components described with reference to FIG. 1, and thus, some additional description thereof may be omitted to avoid redundancy.

Referring to FIG. 2, an electronic device 1001 may display images at an active area AA2. FIG. 2 illustrates a state in which the electronic device 1001 is folded at an angle (e.g., a set or predetermined angle). When the electronic device 1001 is unfolded, the active area AA2 may include a plane defined by the first direction DR1 and the second direction DR2.

The active area AA2 may include a first area AA2_1, a second area AA2_2, and a third area AA2_3. The first area AA2_1, the second area AA2_2, and the third area AA2_3 may be sequentially defined in the first direction DR1. The second area AA2_2 may be bent around a folding axis FX extending in the second direction DR2. Accordingly, the first area AA2_1 and the third area AA2_3 may be referred to as non-folding areas, and the second area AA2_2 may be referred to as a folding area.

When the electronic device 1001 is folded, the first area AA2_1 and the third area AA2_3 may face each other. Accordingly, in a fully folded state, the active area AA2 may not be exposed to an outside, which may be referred to as an in-folding. However, this is an example, and a folding operation of the electronic device 1001 is not limited thereto. For example, according to some embodiments of the present disclosure, the electronic device 1001 may be folded such that the first area AA2_1 and the third area AA2_3 are opposite to each other (or are opposing). In this case, the active area AA2 may be exposed to the outside, which may be referred to as an out-folding.

The electronic device 1001 may perform only one operation of the in-folding or the out-folding. Alternatively, the electronic device 1001 may operate to enable both the in-folding operation and the out-folding operation. In this case, the second area AA2_2 of the electronic device 1001 may be in-folded and out-folded.

In FIG. 2, one folding area and two non-folding areas are illustrated, by way of example, but the number of folding areas and the number of non-folding areas are not limited thereto. For example, the electronic device 1001 may include more than two non-folding areas and a plurality of folding areas each located between adjacent non-folding areas.

FIG. 2 illustrates that the folding axis FX extends in the second direction DR2, but the present disclosure is not limited thereto. For example, the folding axis FX may extend in a direction parallel to the first direction DR1. In this case, the first area AA2_1, the second area AA2_2, and the third area AA2_3 may be sequentially arranged in the second direction DR2.

The active area AA2 may overlap at least one electronic module. For example, the electronic modules may include a camera module and a proximity illuminance sensor. The electronic modules may receive an external input transferred through the active area AA2 or may provide an output through the active area AA2. A portion of the active area AA2, which overlaps the camera module and the proximity illuminance sensor, may have a higher transmittance than the other portion of the active area AA2. Accordingly, it is not necessary to provide an area, in which a plurality of electronic modules are to be arranged, in a peripheral area NAA2 surrounding the active area AA2. As a result, an area ratio of the active area AA2 to the front surface of the electronic device 1001 may be increased.

The electronic device 1001 and the input device 2000 may perform bidirectional communication. The electronic device 1001 may provide the search signal to the input device 2000. The input device 2000 may provide the downlink signal to the electronic device 1001. The electronic device 1001 may detect a location of the input device 2000 by using information provided from the input device 2000.

Figure 3:
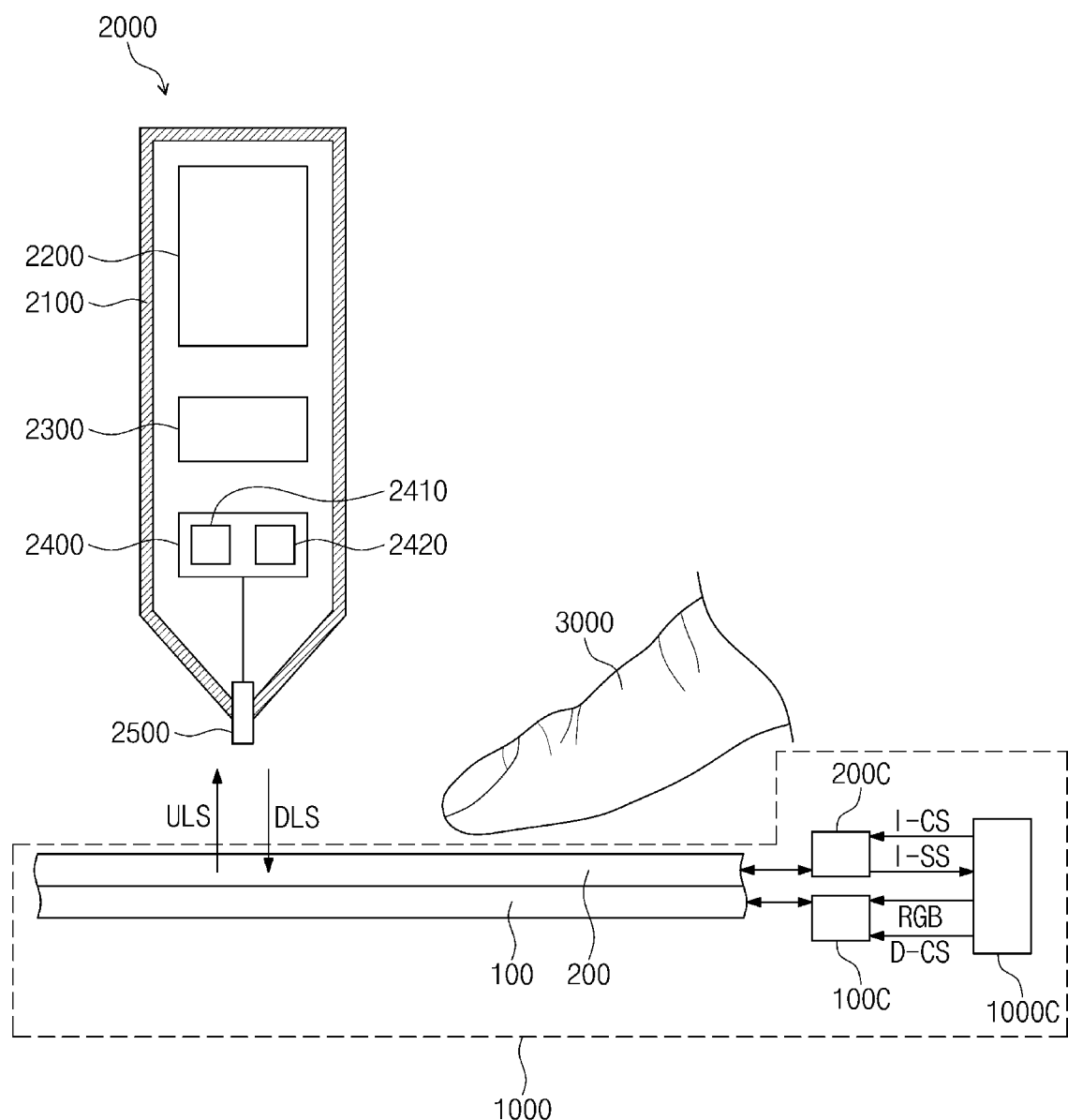
FIG. 3 is a block diagram schematically illustrating an electronic device and an input device according to some embodiments of the present disclosure.

FIG. 3 is a block diagram schematically illustrating an electronic device and an input device according to some embodiments of the present disclosure.

Referring to FIG. 3, the electronic device 1000 may include a display panel 100, an input sensor 200, a panel driver 100C, a sensor controller 200C, and a main controller 1000C.

The display panel 100 may be a component that actually generates an image. The display panel 100 may be an emissive display panel, and for example, the display panel 100 may be an organic light emitting display panel, a quantum dot display panel, a micro LED display panel, or a nano LED display panel.

The input sensor 200 may be located on the display panel 100. The input sensor 200 may detect an externally applied input. The input sensor 200 may detect a first input by the input device 2000 and a second input by a user's body 3000.

The main controller 1000C may control an overall operation of the electronic device 1000. For example, the main controller 1000C may control the operation of the panel driver 100C and the sensor controller 200C. The main controller 1000C may include at least one microprocessor, and the main controller 1000C may be referred to as a host.

The panel driver 100C may control driving of the display panel 100. The main controller 1000C may further include a graphics controller. The panel driver 100C may receive image data RGB and a control signal D-CS from the main controller 1000C. The control signal D-CS may include various signals. For example, the control signal D-CS may include a vertical synchronization signal, a horizontal synchronization signal, a main clock, and a data enable signal. The panel driver 100C may generate a vertical start signal and a horizontal start signal for controlling timing of providing a signal to the display panel 100, based on the control signal D-CS.

The sensor controller 200C may control the input sensor 200. The sensor controller 200C may receive a sensing control signal I-CS from the main controller 1000C. The sensing control signal I-CS may include a mode determination signal for determining a driving mode of the sensor controller 200C and a clock signal. Depending on the sensing control signal I-CS, the sensor controller 200C may operate in a first mode for detecting the first input by the input device 2000, or may operate in a second mode for detecting the second input by the user's body 3000. When the user selects to enter the first mode through a user interface, the first mode may be activated. Also, when the electronic device 1000 searches for the input device 2000 and thus the input device 2000 is found, the first mode may be activated. When the first mode is not activated, the sensor controller 200C may operate in the second mode. For example, in a normal state, the sensor controller 200C may operate in the second mode.

The sensor controller 200C may calculate coordinate information of the first input or the second input, based on the signal received from the input sensor 200, and may provide a coordinate signal I-SS having the coordinate information to the main controller 1000C. The main controller 1000C allows an operation corresponding to the first input or the second input to be executed based on the coordinate signal I-SS. For example, the main controller 1000C may allow the panel driver 100C to display a new image on the display panel 100, based on the coordinate signal I-SS.

The input device 2000 may include a housing 2100, a power source 2200, a pen controller 2300, a communication module 2400, and a pen electrode 2500. However, the components of the input device 2000 are not limited to the above-listed components. For example, the input device 2000 may further include an electrode switch used to switch to a signal transmission mode or a signal reception mode, a pressure sensor that detects a pressure, a memory that stores information (e.g., set or predetermined information), a rotation sensor that detects a rotation, a haptic feedback component (e.g., providing vibration in response to input), etc.

The housing 2100 may be in the shape of a pen, and an accommodation space may be formed therein. The power source 2200, the pen controller 2300, the communication module 2400, and the pen electrode 2500 may be accommodated in the accommodation space defined inside the housing 2100.

The power source 2200 may supply power to a module inside the input device 2000, for example, the pen controller 2300, the communication module 2400, etc. The power source 2200 may include a battery or a high capacity capacitor.

The pen controller 2300 may control an operation of the input device 2000. The pen controller 2300 may be an application-specific integrated circuit (ASIC). The pen controller 2300 may be configured to operate depending on a designed program.

The communication module 2400 may include a transmission circuit 2410 and a reception circuit 2420. The transmission circuit 2410 may output a downlink signal DLS to the input sensor 200. The reception circuit 2420 may receive a search signal ULS provided from the input sensor 200. In this case, the search signal ULS may be the upward search signal provided from the electronic device 1000 to the input device 2000. The transmission circuit 2410 may receive a signal provided from the pen controller 2300 and may convert the received signal into a signal that may be sensed by the input sensor 200, and the reception circuit 2420 may convert the signal provided from the input sensor 200 into a signal that may be processed by the pen controller 2300.

The pen electrode 2500 may be electrically connected to the communication module 2400. A portion of the pen electrode 2500 may protrude from the housing 2100. In addition, the input device 2000 may further include a cover housing that covers the pen electrode 2500 exposed from the housing 2100. Alternatively, the pen electrode 2500 may be embedded in the housing 2100.

Figure 4A:
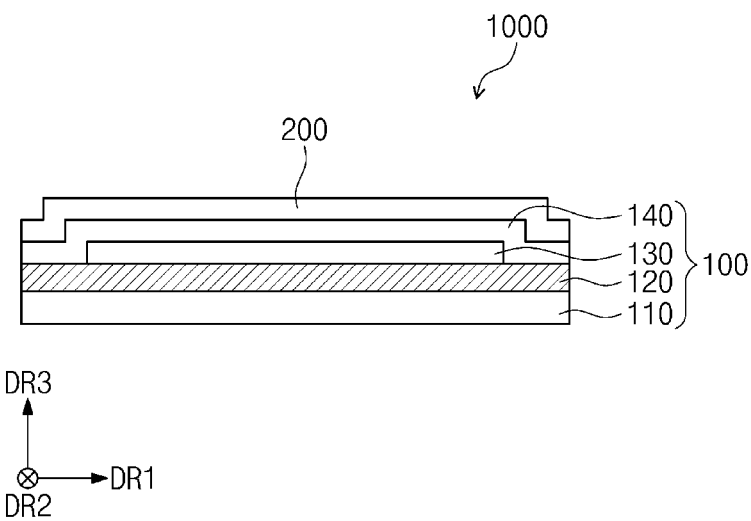
FIGS. 4A and 4B are cross-sectional views of an electronic device according to some embodiments of the present disclosure.

FIG. 4A is a cross-sectional view of an electronic device according to some embodiments of the present disclosure.

Referring to FIG. 4A, the electronic device 1000 may include the display panel 100 and the input sensor 200. The display panel 100 may include a base layer 110, a circuit layer 120, a light emitting element layer 130, and an encapsulation layer 140.

The base layer 110 may be a member that provides a base surface on which the circuit layer 120 is located. The base layer 110 may be a glass substrate, a metal substrate, or a polymer substrate. However, embodiments according to the present disclosure are not limited thereto, and the base layer 110 may be an inorganic layer, an organic layer, or a composite material layer.

The base layer 110 may have a multilayer structure. For example, the base layer 110 may include a first synthetic resin layer, a silicon oxide (SiOx) layer located on the first synthetic resin layer, an amorphous silicon (a-Si) layer located on the silicon oxide layer, and a second synthetic resin layer located on the amorphous silicon layer. The silicon oxide layer and the amorphous silicon layer may be referred to as a base barrier layer.

Each of the first synthetic resin layer and the second synthetic resin layer may include a polyimide resin. In addition, each of the first synthetic resin layer and the second synthetic resin layer may include at least one of an acrylic resin, a methacrylate resin, a polyisoprene resin, a vinyl resin, an epoxy resin, a urethane resin, a cellulose resin, a siloxane resin, a polyamide resin, or a perylene resin.

The circuit layer 120 may be located on the base layer 110. The circuit layer 120 may include an insulating layer, a semiconductor pattern, a conductive pattern, and a signal line. The insulating layer, a semiconductor layer, and a conductive layer are formed on the base layer 110 by a process such as coating or vapor deposition, and thereafter, the insulating layer, the semiconductor layer, and the conductive layer may be selectively patterned through a plurality of photolithography processes. After that, the semiconductor pattern, the conductive pattern, and the signal line included in the circuit layer 120 may be formed.

The light emitting element layer 130 may be located on the circuit layer 120. The light emitting element layer 130 may include a light emitting element. For example, the light emitting element layer 130 may include an organic light emitting material, a quantum dot, a quantum rod, a micro LED, or a nano LED.

The encapsulation layer 140 may be located on the light emitting element layer 130. The encapsulation layer 140 may protect the light emitting element layer 130 from foreign substances such as moisture, oxygen, and dust particles.

The input sensor 200 may be formed on the display panel 100 through a plurality of successive processes. In this case, the input sensor 200 may be directly located on the display panel 100. The term "directly located on" may mean that a third component is not located between the input sensor 200 and the display panel 100. For example, a separate adhesive member may not be located between the input sensor 200 and the display panel 100. Alternatively, the input sensor 200 may be coupled to the display panel 100 through the adhesive member. The adhesive member may include a conventional glue or an adhesive.

Figure 4B:
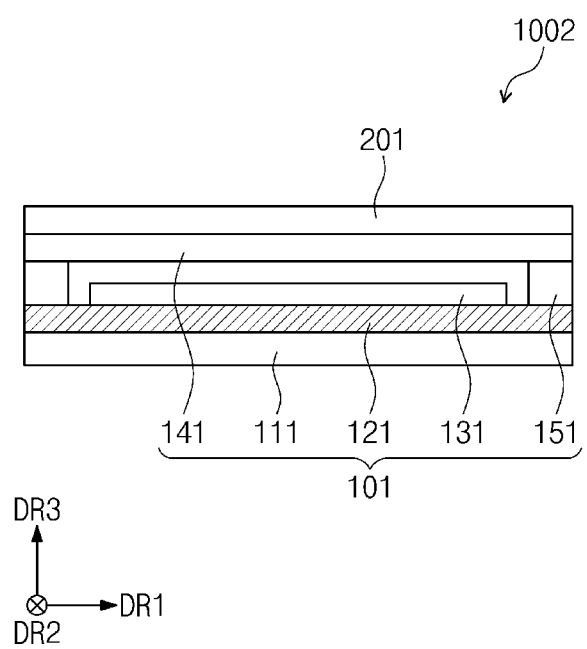

FIG. 4B is a cross-sectional view of an electronic device according to some embodiments of the present disclosure.

Referring to FIG. 4B, an electronic device 1002 may include a display panel 101 and an input sensor 201. The display panel 101 may include a base substrate 111, a circuit layer 121, a light emitting element layer 131, an encapsulation substrate 141, and a coupling member 151.

Each of the base substrate 111 and the encapsulation substrate 141 may be a glass substrate, a metal substrate, or a polymer substrate, but the present disclosure is not particularly limited thereto.

The coupling member 151 may be located between the base substrate 111 and the encapsulation substrate 141. The coupling member 151 may couple the encapsulation substrate 141 to the base substrate 111 or the circuit layer 121. The coupling member 151 may include an inorganic material or an organic material. For example, the inorganic material may include a frit seal, and the organic material may include a photocurable resin or a photoplastic resin. However, the material of the coupling member 151 is not limited to the above example.

The input sensor 201 may be directly located on the encapsulation substrate 141. The term "directly located on" may mean that a third component is not located between the input sensor 201 and the encapsulation substrate 141. For example, a separate adhesive member may not be located between the input sensor 201 and the display panel 101. However, embodiments according to the present disclosure are not limited thereto, and an adhesive layer may be further located between the input sensor 201 and the encapsulation substrate 141.

Figure 5:
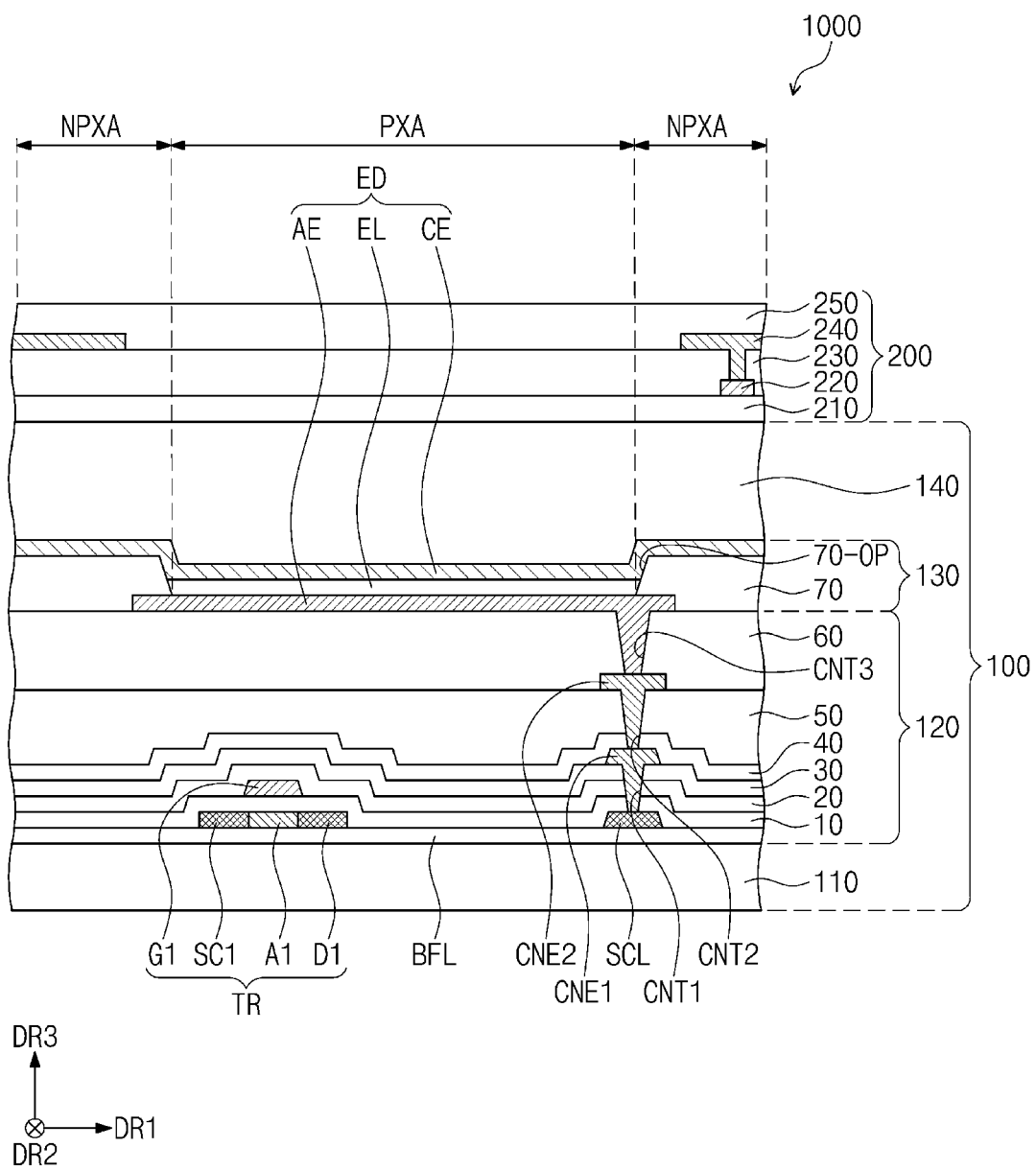
FIG. 5 is a cross-sectional view of an electronic device according to some embodiments of the present disclosure.

FIG. 5 is a cross-sectional view of an electronic device according to some embodiments of the present disclosure. In the description of FIG. 5, the same reference numerals are used for the components described with reference to FIG. 4A, and descriptions thereof are omitted.

Referring to FIG. 5, at least one inorganic layer may be formed on the upper surface of the base layer 110. The inorganic layer may include at least one of aluminum oxide, titanium oxide, silicon oxide silicon oxynitride, zirconium oxide, or hafnium oxide. The inorganic layer may be formed in multiple layers. The multilayered inorganic layers may constitute a barrier layer and/or a buffer layer. According to some embodiments, the display panel 100 is illustrated to include a buffer layer BFL.

The buffer layer BFL may improve bonding force between the base layer 110 and the semiconductor pattern. The buffer layer BFL may include a silicon oxide layer and a silicon nitride layer, and the silicon oxide layer and the silicon nitride layer may be alternately stacked.

The semiconductor pattern may be located on the buffer layer BFL. The semiconductor pattern may include polysilicon. However, embodiments according to the present disclosure are not limited thereto, and the semiconductor pattern may include amorphous silicon, low-temperature polycrystalline silicon, or an oxide semiconductor.

FIG. 5 illustrates only a part of the semiconductor pattern, and the semiconductor pattern may be further arranged in other areas. The semiconductor pattern may be formed in a specific rule over pixels. The semiconductor pattern may have different electrical properties depending on whether it is doped. The semiconductor pattern may include a first region having relatively high conductivity and a second region having relatively low conductivity. The first region may be doped with an N-type dopant or a P-type dopant. A P-type transistor may include a doped region doped with the P-type dopant, and an N-type transistor may include a doped region doped with the N-type dopant. The second region may be an undoped region or may be doped with a lower concentration than the first region.

The conductivity of the first region may be greater than that of the second region, and may substantially serve as an electrode or a signal line. The second region may substantially correspond to an active (or channel) of the transistor. In other words, a part of the semiconductor pattern may be an active of the transistor, another part of the semiconductor pattern may be a source or a drain of the transistor, and the other part of the semiconductor pattern may be a connection electrode or a connection signal line.

Each of the pixels may have an equivalent circuit including seven transistors, one capacitor, and a light emitting element, and the equivalent circuit of the pixel may be modified in various forms. In FIG. 5, one transistor TR and a light emitting element ED included in the pixel are illustrated as an example.

The transistor TR may include a source SC1, a channel A1, a drain D1, and a gate G1. The source SC1, the channel A1, and the drain D1 may be formed from the semiconductor pattern. The source SC1 and the drain D1 may extend in opposite directions from the channel A1 on a cross section thereof. FIG. 5 illustrates a part of a connection signal line SCL formed from the semiconductor pattern. According to some embodiments, the connection signal line SCL may be electrically connected to the drain D1 of the transistor TR on a plane.

A first insulating layer 10 may be located on the buffer layer BFL. The first insulating layer 10 may overlap a plurality of pixels in common and may cover the semiconductor pattern. The first insulating layer 10 may be an inorganic layer and/or an organic layer, and may have a single layer structure or a multilayer structure. The first insulating layer 10 may include at least one of aluminum oxide, titanium oxide, silicon oxide, silicon nitride, silicon oxynitride, zirconium oxide, or hafnium oxide. According to some embodiments, the first insulating layer 10 may be a single silicon oxide layer. In addition to the first insulating layer 10, the insulating layer of the circuit layer 120 to be described later may be an inorganic layer and/or an organic layer, and may have a single layer structure or a multilayer structure. The inorganic layer may include at least one of the aforementioned materials, but embodiments according to the present disclosure are not limited thereto.

The gate G1 is located on the first insulating layer 10. The gate G1 may be a part of a metal pattern. The gate G1 overlaps the channel A1. In the process of doping the semiconductor pattern, the gate G1 may function as a mask.

A second insulating layer 20 is located on the first insulating layer 10 and may cover the gate Gl. The second insulating layer 20 may overlap the pixels in common. The second insulating layer 20 may be an inorganic layer and/or an organic layer, and may have a single layer structure or a multilayer structure. The second insulating layer 20 may include at least one of silicon oxide, silicon nitride, or silicon oxynitride. According to some embodiments, the second insulating layer 20 may have the multilayer structure including the silicon oxide layer and the silicon nitride layer.

A third insulating layer 30 may be located on the second insulating layer 20. The third insulating layer 30 may have a single layer structure or a multilayer structure. For example, the third insulating layer 30 may have the multilayer structure including a silicon oxide layer and a silicon nitride layer.

A first connection electrode CNE1 may be located on the third insulating layer 30. The first connection electrode CNE1 may be connected to the connection signal line SCL through a contact hole CNT1 penetrating the first insulating layer 10, the second insulating layer 20, and the third insulating layer 30.

A fourth insulating layer 40 may be located on the third insulating layer 30. The fourth insulating layer 40 may be a single silicon oxide layer. A fifth insulating layer 50 may be located on the fourth insulating layer 40. The fifth insulating layer 50 may be an organic layer.

A second connection electrode CNE2 may be located on the fifth insulating layer 50. The second connection electrode CNE2 may be connected to the first connection electrode CNE1 through a contact hole CNT2 penetrating the fourth insulating layer 40 and the fifth insulating layer 50.

A sixth insulating layer 60 is located on the fifth insulating layer 50 and may cover the second connection electrode CNE2. The sixth insulating layer 60 may be an organic layer.

The light emitting element layer 130 may be located on the circuit layer 120. The light emitting element layer 130 may include the light emitting element ED. For example, the light emitting element layer 130 may include an organic light emitting material, a quantum dot, a quantum rod, a micro LED, or a nano LED. Hereinafter, a description will be given that the light emitting element ED is the organic light emitting element, but is not limited thereto.

The light emitting element ED may include a first electrode AE, an emission layer EL, and a second electrode CE. The first electrode AE may be located on the sixth insulating layer 60. The first electrode AE may be connected to the second connection electrode CNE2 through a contact hole CNT3 penetrating through the sixth insulating layer 60.

A pixel defining layer 70 may be located on the sixth insulating layer 60 and may cover a part of the first electrode AE. An opening 70-OP is defined in the pixel defining layer 70. The opening 70-OP of the pixel defining layer 70 exposes at least a part of the first electrode AE.

The active area AA1 (refer to FIG. 1) may include an emission area PXA and a non-emission area NPXA adjacent to the emission area PXA. The non-emission area NPXA may surround the emission area PXA. According to some embodiments, the emission area PXA is defined to correspond to a partial area of the first electrode AE exposed by the opening 70-OP.

The emission layer EL may be located on the first electrode AE. The emission layer EL may be located in an area corresponding to the opening 70-OP. For example, the emission layer EL may be formed separately on each of the pixels. When the emission layer EL is formed separately on each of the pixels, each of the emission layers EL may emit light of at least one color of blue, red, and green. However, embodiments according to the present disclosure are not limited thereto, and the emission layer EL may be connected to the pixels and may be provided in common. In this case, the emission layer EL may provide blue light or white light.

The second electrode CE may be located on the emission layer EL. The second electrode CE may have an integral shape and may be commonly formed with or utilized by a plurality of pixels.

According to some embodiments, a hole control layer may be located between the first electrode AE and the emission layer EL. The hole control layer may be commonly arranged in the emission area PXA and the non-emission area NPXA. The hole control layer may include a hole transport layer, and may further include a hole injection layer. An electronic control layer may be located between the emission layer EL and the second electrode CE. The electron control layer may include an electron transport layer, and may further include an electron injection layer. The hole control layer and the electron control layer may be commonly formed to a plurality of pixels using an open mask.

The encapsulation layer 140 may be located on the light emitting element layer 130. The encapsulation layer 140 may include an inorganic layer, an organic layer, and an inorganic layer sequentially stacked, but the layers of the encapsulation layer 140 are not limited thereto.

The inorganic layers may protect the light emitting element layer 130 from moisture and oxygen, and the organic layer may protect the light emitting element layer 130 from foreign substances such as dust particles. The inorganic layers may include a silicon nitride layer, a silicon oxynitride layer, a silicon oxide layer, a titanium oxide layer, or an aluminum oxide layer. The organic layer may include an acrylic organic layer, but embodiments according to the present disclosure are not limited thereto.

The input sensor 200 may be formed on the display panel 100 through a plurality of successive processes. For example, the input sensor 200 may be directly located on the display panel 100. Alternatively, the input sensor 200 may be coupled to the display panel 100 through an adhesive member. The adhesive member may include a conventional glue or an adhesive.

The input sensor 200 may include a base insulating layer 210, a first conductive layer 220, a sensing insulating layer 230, a second conductive layer 240, and a cover insulating layer 250.

The base insulating layer 210 may be an inorganic layer including at least one of silicon nitride, silicon oxynitride, or silicon oxide. Alternatively, the base insulating layer 210 may be an organic layer including an epoxy resin, an acrylic resin, or an imide resin. The base insulating layer 210 may have a single layer structure or may have a multilayer structure stacked along the third direction DR3.

Each of the first conductive layer 220 and the second conductive layer 240 may have a single layer structure or may have a multilayer structure stacked along the third direction DR3.

The conductive layer of the single layer structure may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), or indium zinc tin oxide (IZTO). In addition, the transparent conductive layer may include a conductive polymer such as a PEDOT, a metal nanowire, a graphene, etc.

The conductive layer of the multilayer structure may include metal layers. The metal layers may have a three-layer structure of, for example, titanium/aluminum/titanium. The conductive layer of the multilayer structure may include at least one metal layer and at least one transparent conductive layer.

At least one of the sensing insulating layer 230 or the cover insulating layer 250 may include an inorganic layer. The inorganic layer may include at least one of aluminum oxide, titanium oxide, silicon oxide, silicon nitride, silicon oxynitride, zirconium oxide, or hafnium oxide.

At least one of the sensing insulating layer 230 or the cover insulating layer 250 may include an organic layer. The organic layer may include at least one of acrylic resin, methacrylic resin, polyisoprene resin, vinyl resin, epoxy resin, urethane resin, cellulose resin, siloxane resin, polyimide resin, polyamide resin, or perylene resin.

Figure 6:
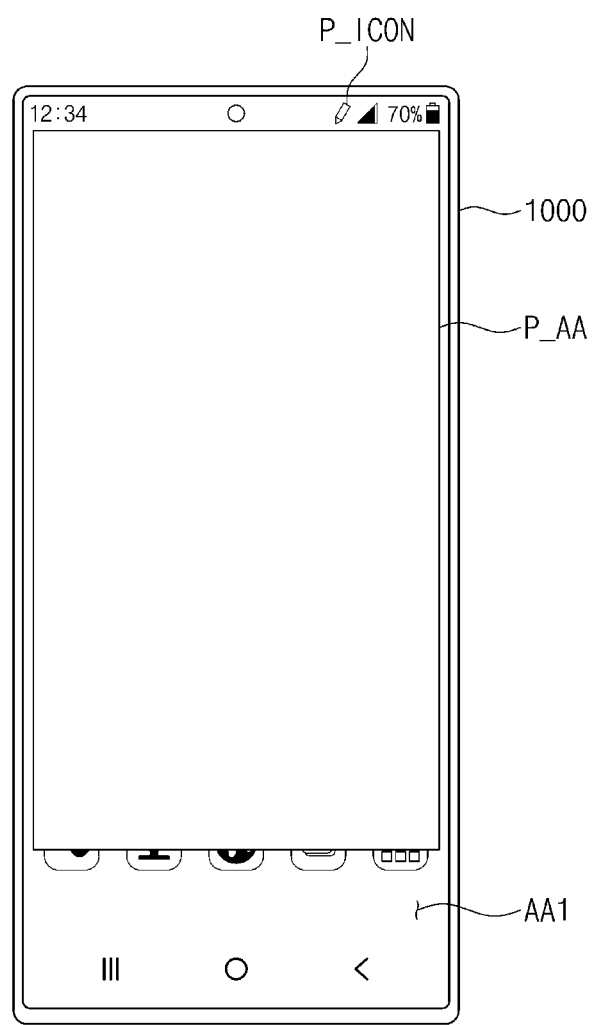
FIG. 6 is a diagram illustrating an electronic device operating in a first mode according to some embodiments of the present disclosure.
Figure 7:
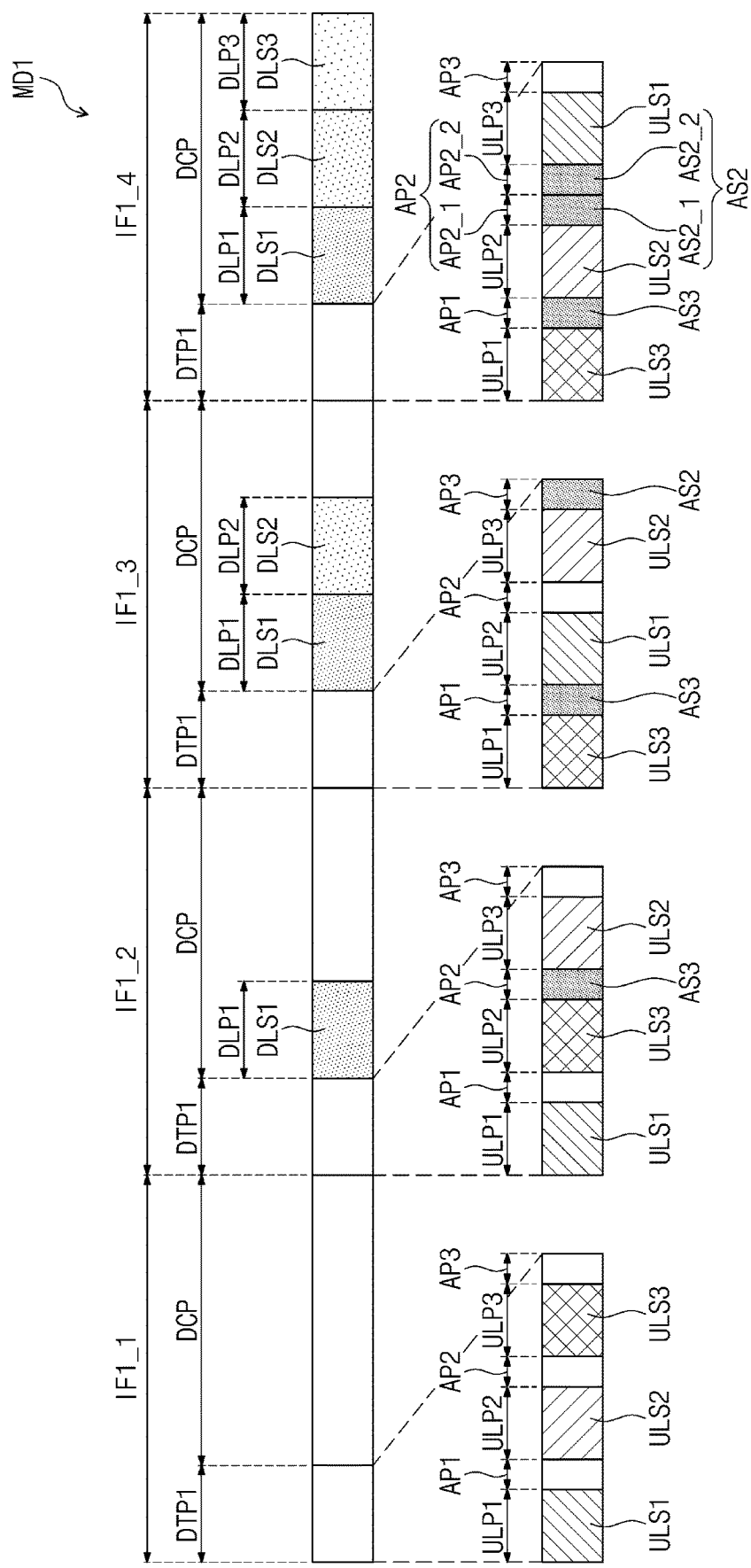
FIG. 7 is a conceptual diagram illustrating an operation of the first mode according to some embodiments of the present disclosure.
Figure 8A:
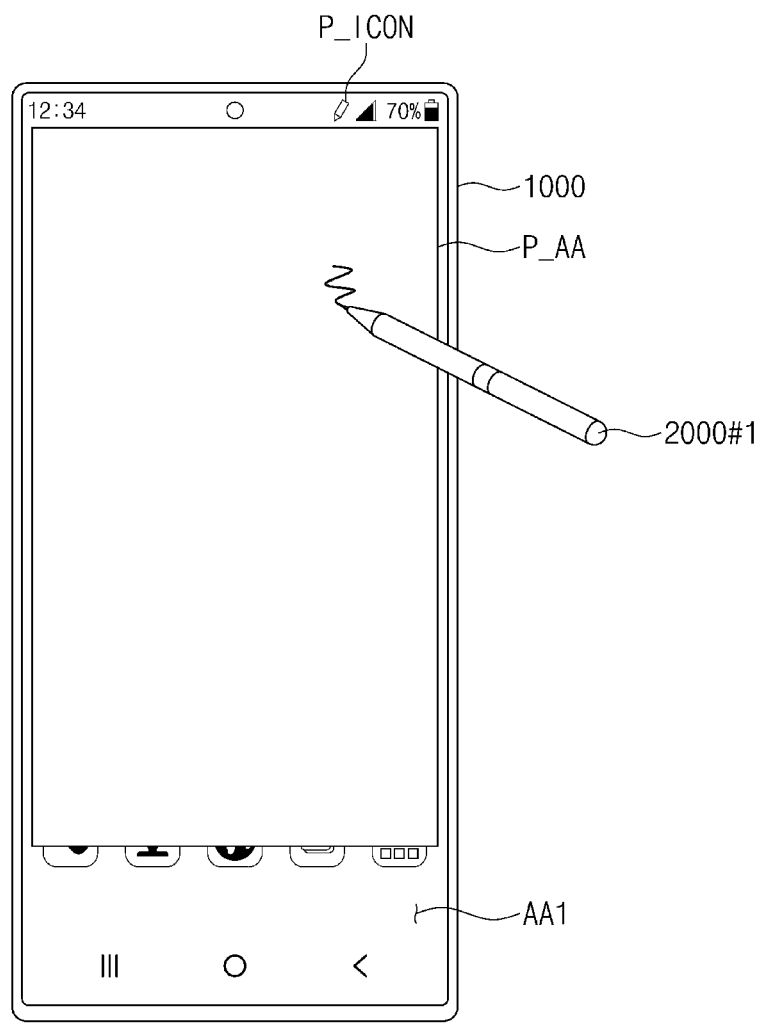
FIGS. 8A to 8C are diagrams illustrating a state of detecting a first input in a first mode according to some embodiments of the present disclosure.
Figure 8B:
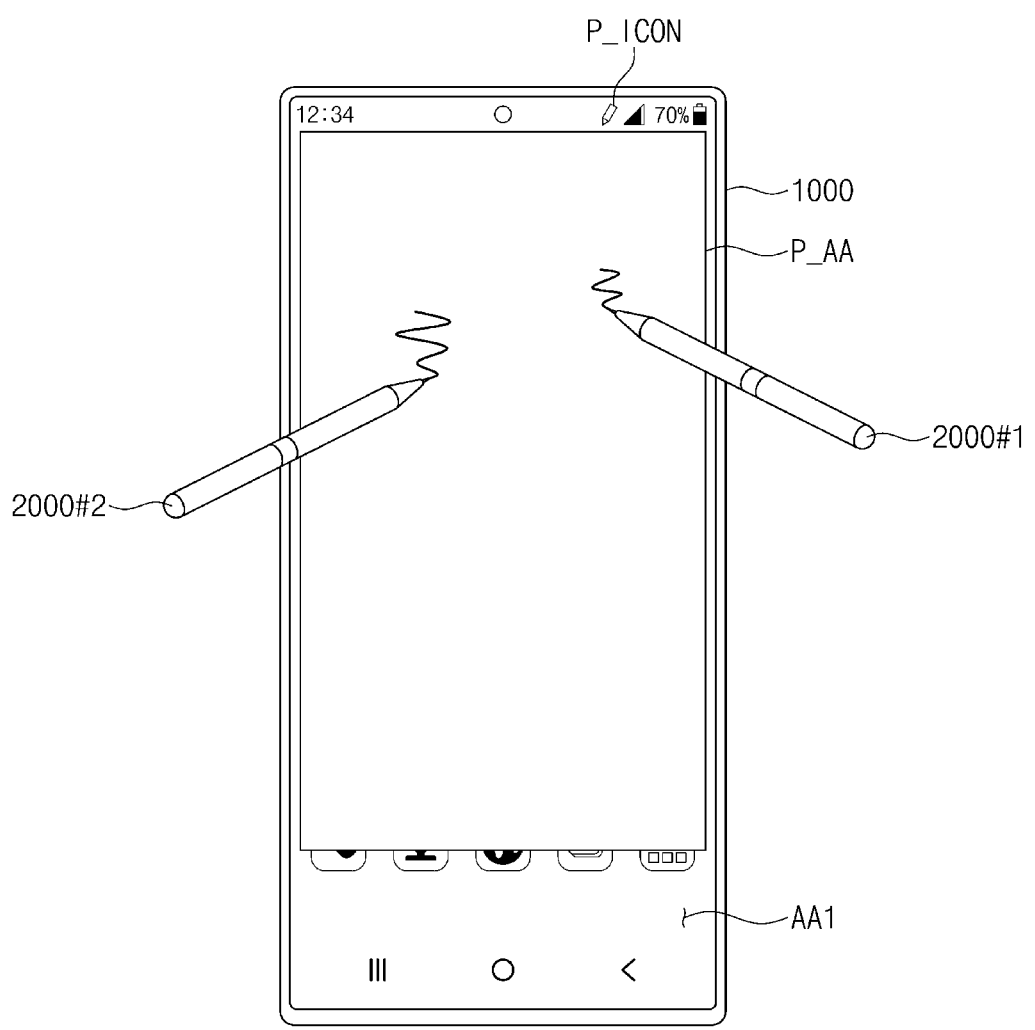
Figure 8C:
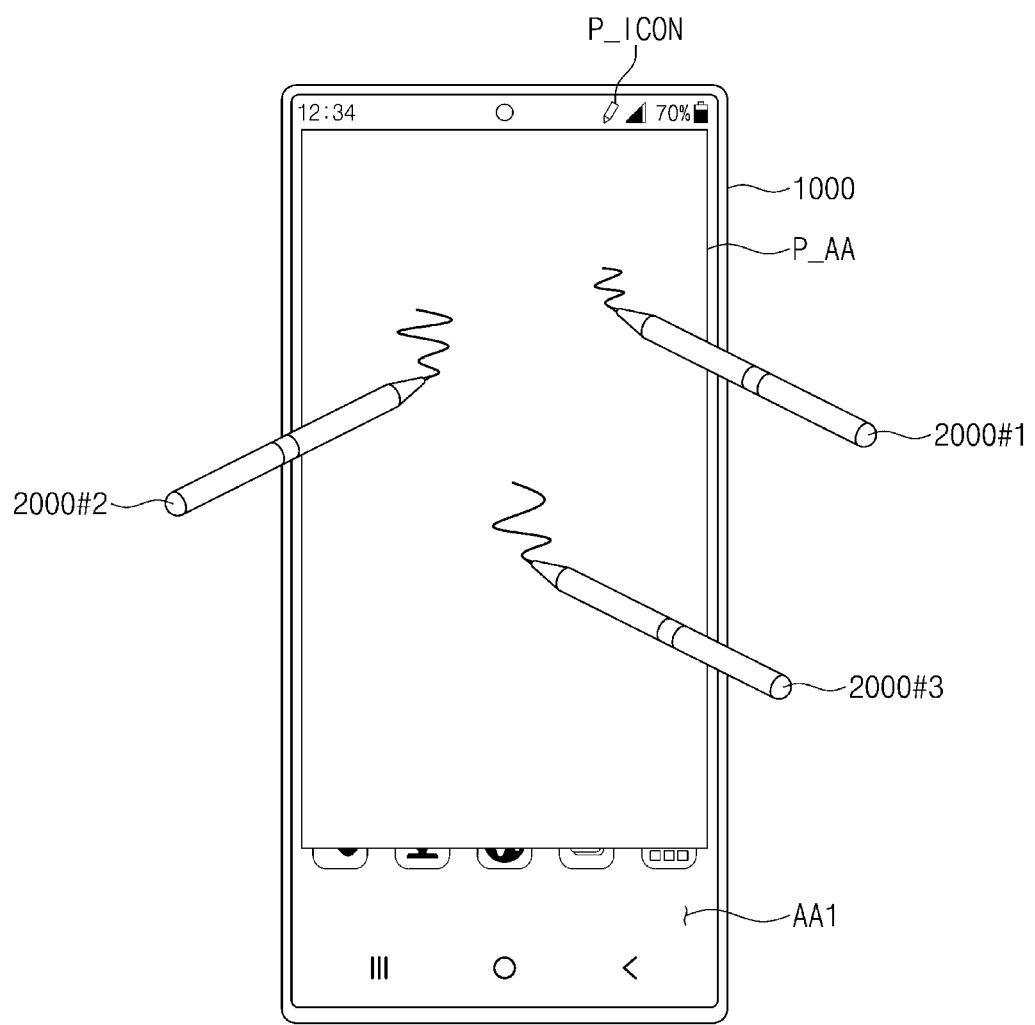

FIG. 6 is a diagram illustrating an electronic device operating in a first mode according to some embodiments of the present disclosure, and FIG. 7 is a conceptual diagram illustrating an operation of the first mode according to some embodiments of the present disclosure. FIGS. 8A to 8C are diagrams illustrating a state of detecting a first input in a first mode according to some embodiments of the present disclosure.

Referring to FIGS. 3, 6, and 7, the sensor controller 200C may operate in the first mode of detecting the first input by the input device 2000 or the second mode of detecting the second input by the user's body 3000.

The user may select to enter a first mode MD1 through the user interface. For example, when entering the first mode MD1 is selected, a pen icon P_ICON may be displayed in the active area AA1 (refer to FIG. 1) of the electronic device 1000. In this case, the sensor controller 200C may operate in the first mode MD1. As an example of the present disclosure, in the first mode MD1, a pen recognition area P_AA may be displayed in the active area AA1 of the electronic device 1000.

When the first mode MD1 is activated, the sensor controller 200C operates to detect the first input in the first mode MD1. In the first mode MD1, the sensor controller 200C may detect the first input in units of input detection frame. Hereinafter, for convenience of description, the input detection frame in the first mode MD1 is referred to as a pen input detection frame. In FIG. 7, four pen input detection frames IF1_1 to IF1_4 are illustrated as an example.

Each of the four pen input detection frames IF1_1 to IF1_4 has a uniform section width. The sensor controller 200C may operate at a frequency of 60 Hz to 480 Hz. For example, when the sensor controller 200C operates at a frequency of 60 Hz, each of the pen input detection frames IF1_1 to IF1_4 has a section width of approximately 16.66 ms. When the sensor controller 200C operates at a frequency of 240 Hz, each of the pen input detection frames IF1_1 to IF1_4 has a section width of approximately 4.16 ms. However, the operating frequency of the sensor controller 200C is not particularly limited thereto, and various frequencies as well as 60 Hz and 240 Hz may be applied.

Each of the pen input detection frames IF1_1 to IF1_4 may include a first search section DTP1 and a communication section DCP. The communication section DCP may be generated after the first search section DTP1. During the first search section DTP1, the sensor controller 200C may transmit a plurality of search signals to the input sensor 200. The plurality of search signals may include two or more search signals capable of communicating through two or more different protocols, respectively. As an example of the present disclosure, the plurality of search signals may include three search signals capable of communicating through three different protocols, respectively. Hereinafter, the three search signals are referred to as a first search signal ULS1, a second search signal ULS2, and a third search signal ULS3, respectively. Each of the first to third search signals ULS1 to ULS3 may be the upward search signal transmitted from the electronic device 1000 to the input device 2000 through the input sensor 200.

As an example of the present disclosure, the first search signal ULS1 is a signal capable of communicating through (or corresponding to) a first protocol, the second search signal ULS2 is a signal capable of communicating through (or corresponding to) a second protocol, and the third search signal ULS3 is a signal capable of communicating through (or corresponding to) a third protocol. The first to third protocols may be different protocols for communicating/signaling for active stylus pens in the context of tablet or stylus touch input. For example, the first protocol may be a Microsoft™ Pen Protocol (MPP), the second protocol may be an Active ElectroStatic (AES) protocol of the Wacom™ company, Ltd. of Japan, and the third protocol may be a Universal Stylus Initiative™ (USI) pen protocol. In FIG. 7, only three search signals are disclosed, but embodiments according to the present disclosure are not limited thereto. For example, the plurality of search signals may further include a signal capable of communicating in compliance with a protocol other than the above-described protocols. The first to third search signals ULS1 to ULS3 may be signals having different frequencies, different voltage levels, or different waveforms.

The first search section DTP1 may include a first uplink section ULP1, a second uplink section ULP2, and a third uplink section ULP3. The first to third uplink sections ULP1 to ULP3 are sequentially arranged over time and do not overlap one another on a time axis. For example, the second uplink section ULP2 may be generated after the first uplink section ULP1 ends, and the third uplink section ULP3 may be generated after the second uplink section ULP2 ends.

During the first search section DTP1, the electronic device 1000 outputs the first to third search signals ULS1 to ULS3. The sensor controller 200C determines priorities of the first to third search signals ULS1 to ULS3, and outputs the first to third search signals ULS1 to ULS3 depending on the priority.

As an example of the present disclosure, the sensor controller 200C may output the first search signal ULS1 during the first uplink section ULP1 of a first pen input detection frame IF1_1, the second search signal ULS2 during the second uplink section ULP2 of the first pen input detection frame IF1_1, and the third search signal ULS3 during the third uplink section ULP3 of the first pen input detection frame IF1_1. Priorities of the first to third search signals ULS1 to ULS3 may be varied in units of at least one pen input detection frame.

The first search section DTP1 may further include a response section. The response section may include a first response section AP1, a second response section AP2, and a third response section AP3. The first response section AP1 is placed between the first uplink section ULP1 and the second uplink section ULP2. For example, the first response section AP1 is defined as a section from a time when the first uplink section ULP1 ends to a time before the second uplink section ULP2 starts. The second response section AP2 is placed between the second uplink section ULP2 and the third uplink section ULP3. The second response section AP2 is defined as a section from the end of the second uplink section ULP2 to before the start of the third uplink section ULP3. The third response section AP3 is placed between the third uplink section ULP3 and the communication section DCP. The third response section AP3 is defined as a section from the end of the third uplink section ULP3 to before the start of the communication section DCP. The first to third response sections AP1 to AP3 do not overlap one another on a time axis, and do not overlap the first to third uplink sections ULP1 to ULP3 on a time axis.

During the first response section AP1, the sensor controller 200C receives a response signal to the search signal output during the first uplink section ULP1 or waits for the response signal, and during the second response section AP2, the sensor controller 200C receives a response signal to the search signal output during the second uplink section ULP2 or waits for the response signal. In addition, during the third response section AP3, the sensor controller 200C receives a response signal to the search signal output during the third uplink section ULP3 or waits for the response signal. In this case, the response signal associated with the first search signal ULS1 is referred to as a first response signal, the response signal associated with the second search signal ULS2 is referred to as a second response signal AS2, and the response signal associated with the third search signal ULS3 is referred to as a third response signal AS3.

In the first pen input detection frame IF1_1, the sensor controller 200C may not receive the response signal associated with the first to third search signals ULS1 to ULS3. In this case, data communication between the input device 2000 and the sensor controller 200C is not performed in the communication section DCP of the first pen input detection frame IF1_1.

The sensor controller 200C may output the first search signal ULS1 during the first uplink section ULP1 of a second pen input detection frame IF1_2, may output the third search signal ULS3 during the second uplink section ULP2 of the second pen input detection frame IF1_2, and may output the second search signal ULS2 during the third uplink section ULP3 of the second pen input detection frame IF1_2. For example, unlike the first pen input detection frame IF1_1, the third search signal ULS3 may be output before the second search signal ULS2 in the second pen input detection frame IF1_2.

Referring to FIGS. 7 and 8A, in the second pen input detection frame IF1_2, a first input device 2000#1 supporting the third protocol may access the electronic device 1000. In this case, the sensor controller 200C may receive the third response signal AS3 associated with the third search signal ULS3 from the first input device 2000#1 during the second response section AP2. Accordingly, during the communication section DCP of the second pen input detection frame IF1_2, the electronic device 1000 may perform data communication with the first input device 2000#1.

During the communication section DCP, the sensor controller 200C may receive a first downlink signal DLS1 provided from the first input device 2000#1 through the input sensor 200. In this case, the first downlink signal DLS1 may be a signal capable of communicating through the third protocol. The communication section DCP may include a first downlink section DLP1 of receiving the first downlink signal DLS1. The sensor controller 200C may detect the first input of the first input device 2000#1, based on the first downlink signal DLS1. The first downlink section DLP1 may have a section width less than that of the communication section DCP.

In the second pen input detection frame IF1_2, the sensor controller 200C receives the third response signal AS3 associated with the third search signal ULS3 and performs data communication with the first input device 2000#1. Thereafter, the priorities of the first to third search signals ULS1 to ULS3 may be updated. For example, the order of the first to third search signals ULS1 to ULS3 may be changed such that the third search signal ULS3 is output before the first and second search signals ULS1 and ULS2.

Referring to FIGS. 7 and 8B, the sensor controller 200C may output the third search signal ULS3 during the first uplink section ULP1 of a third pen input detection frame IF1_3, may output the first search signal ULS1 during the second uplink section ULP2 of the third pen input detection frame IF1_3, and may output the second search signal ULS2 during the third uplink section ULP3 of the third pen input detection frame IF1_3. For example, unlike the second pen input detection frame IF1_2, the third search signal ULS3 may be output prior to the first and second search signals ULS1 and ULS2 in the third pen input detection frame IF1_3.

In the third pen input detection frame IF1_3, the first input device 2000#1 supporting the third protocol and a second input device 2000#2 supporting the second protocol may access the electronic device 1000. In this case, the sensor controller 200C may receive the third response signal AS3 associated with the third search signal ULS3 from the first input device 2000#1 during the first response section AP1. Also, the sensor controller 200C may receive the second response signal AS2 associated with the second search signal ULS2 from the second input device 2000#2 during the third response section AP3. Accordingly, the electronic device 1000 may perform data communication with the first and second input devices 2000#1 and 2000#2 during the communication section DCP of the third pen input detection frame IF1_3.

During the communication section DCP, the sensor controller 200C may receive the first downlink signal DLS1 provided from the first input device 2000#1 through the input sensor 200, and may receive a second downlink signal DLS2 from the second input device 2000#2. In this case, the first downlink signal DLS1 may be a signal capable of communicating through the third protocol, and the second downlink signal DLS2 may be a signal capable of communicating through the second protocol. The communication section DCP may include the first downlink section DLP1 of receiving the first downlink signal DLS1 and a second downlink section DLP2 of receiving the second downlink signal DLS2. The sensor controller 200C may detect the first input of the first input device 2000#1, based on the first downlink signal DLS1, and may detect the first input of the second input device 2000#2, based on the second downlink signal DLS2. Each of the first and second downlink sections DLP1 and DLP2 may have a section width less than that of the communication section DCP. In addition, the first and second downlink sections DLP1 and DLP2 may not overlap each other on a time axis. For example, the second downlink section DLP2 may start after the first downlink section DLP1 ends.

In the third pen input detection frame IF1_3, after the sensor controller 200C performs data communication with the first and second input devices 2000#1 and 2000#2, the priorities of the first to third search signals ULS1 to ULS3 may be updated. For example, the order of the first to third search signals ULS1 to ULS3 may be determined such that the second and third search signals ULS2 and ULS3 are output before the first search signal ULS1.

Referring to FIGS. 7 and 8C, the sensor controller 200C may output the third search signal ULS3 during the first uplink section ULP1 of a fourth pen input detection frame IF1_4, may output the second search signal ULS2 during the second uplink section ULP2 of the fourth pen input detection frame IF1_4, and may output the first search signal ULS1 during the third uplink section ULP3 of the fourth pen input detection frame IF1_4. For example, unlike the third pen input detection frame IF1_3, the second search signal ULS2 may be output before the first search signal ULS1 in the fourth pen input detection frame IF1_4.

In the fourth pen input detection frame IF1_4, the first input device 2000#1 supporting the third protocol, the second input device 2000#2 supporting the second protocol, and a third input device 2000#3 supporting the second protocol may access the electronic device 1000. In this case, the sensor controller 200C may receive the third response signal AS3 associated with the third search signal ULS3 from the first input device 2000#1 during the first response section AP1. In addition, the sensor controller 200C may receive the second response signal AS2 associated with the second search signal ULS2 from the second and third input devices 2000#2 and 2000#3 during the second response section AP2.

As an example of the present disclosure, when there are two input devices supporting the second protocol, the second response section AP2 may include two sub-response sections (hereinafter, referred to as a first sub-response section AP2_1 and a second sub-response section AP2_2). During the first sub-response section AP2_1, the sensor controller 200C may receive a first sub-response signal AS2_1 from the second input device 2000#2, and during the second sub-response section AP2_2, the sensor controller 200C may receive a second sub response signal AS2_2 from the third input device 2000#3. In this case, the electronic device 1000 may perform data communication with the first to third input devices 2000#1, 2000#2, and 2000#3 during the communication section DCP of the fourth pen input detection frame IF1_4.

During the communication section DCP of the fourth pen input detection frame IF1_4, the sensor controller 200C may receive the first downlink signal DLS1 provided from the first input device 2000#1 through the input sensor 200, may receive the second downlink signal DLS2 from the second input device 2000#2, and may receive a third downlink signal DLS3 from the third input device 2000#3. In this case, the first downlink signal DLS1 may be a signal capable of communicating through the third protocol, and each of the second and third downlink signals DLS2 and DLS3 may be a signal capable of communicating through the second protocol.

The communication section DCP may include the first downlink section DLP1 of receiving the first downlink signal DLS1, the second downlink section DLP2 of receiving the second downlink signal DLS2, and a third downlink section DLP3 of receiving the third downlink signal DLS3. The sensor controller 200C may detect the first input of the first input device 2000#1, based on the first downlink signal DLS1, and may detect the first input of the second input device 2000#2, based on the second downlink signal DLS2. In addition, the sensor controller 200C may detect the first input of the third input device 2000#3, based on the third downlink signal DLS3.

Each of the first to third downlink sections DLP1, DLP2, and DLP3 may have a section width less than that of the communication section DCP. In addition, the first to third downlink sections DLP1, DLP2, and DLP3 may not overlap one another on a time axis. For example, after the first downlink section DLP1 ends, the second downlink section DLP2 may start, and after the second downlink section DLP2 ends, the third downlink section DLP3 may start.

As described above, as the electronic device 1000 outputs the plurality of search signals ULS1 to ULS3 capable of communicating through different protocols during the first search section DTP1 of the pen input detection frames IF1_1 to IF1_4, the electronic device 1000 may search for the access of various types of the input devices 2000#1 to 2000#3. For example, the electronic device 1000 may support a multi-protocol to enable data communication with the various types of the input devices 2000#1 to 2000#3.

In FIG. 7, a case in which the sensor controller 200C transmits a plurality of search signals to the input sensor 200 during the first search section DTP1 is illustrated as an example. However, the sensor controller 200C may receive the downward search signal transmitted through the input sensor 200 during some of the first search section DTP1. In this case, the downward search signal may be a search signal transmitted from the input devices 2000#1 to 2000#3 to the electronic device 1000. As an example of the present disclosure, the first search section DTP1 may further include a downward search section of receiving the downward search signal. The downward search section may not overlap on a time axis with the first to third uplink sections ULP1 to ULP3.

Figure 9:
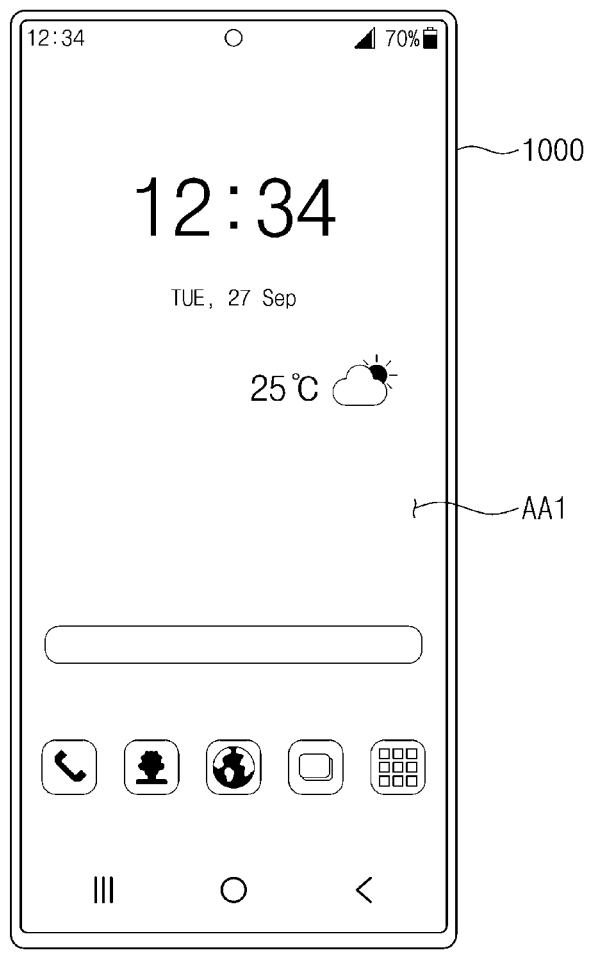
FIG. 9 is a diagram illustrating an electronic device operating in a second mode according to some embodiments of the present disclosure.
Figure 10:
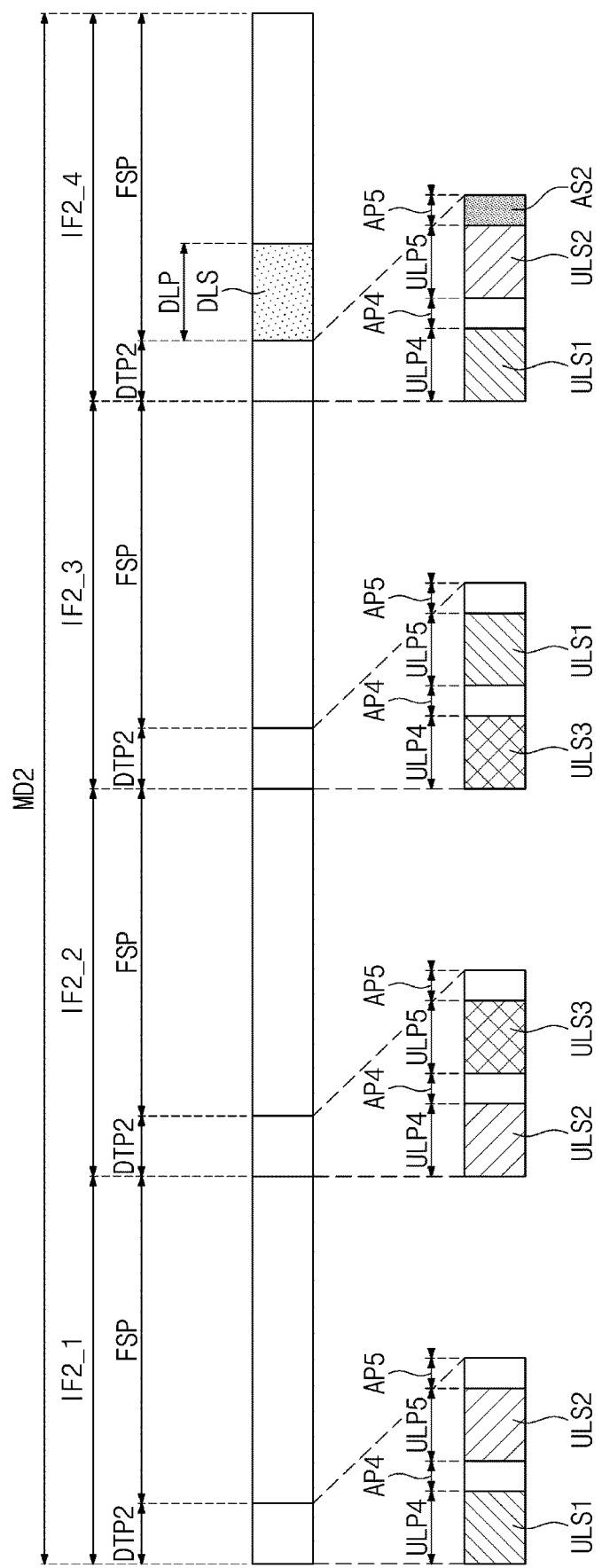
FIG. 10 is a conceptual diagram illustrating an operation in a second mode according to some embodiments of the present disclosure.

FIG. 9 is a diagram illustrating an electronic device operating in a second mode according to some embodiments of the present disclosure, and FIG. 10 is a conceptual diagram illustrating an operation in a second mode according to some embodiments of the present disclosure.

Referring to FIGS. 3, 9, and 10, the sensor controller 200C may operate in the second mode MD2 after the first mode MD1 (illustrated in FIG. 7) ends.

The second mode MD2 may include a second search section DTP2 and a detection section FSP. The detection section FSP may proceed after the second search section DTP2. During the second search section DTP2, the sensor controller 200C may transmit the search signal to the input sensor 200. During the detection section FSP, the sensor controller 200C may detect the second input by the user's body 3000.

When the second mode MD2 is activated, the sensor controller 200C operates to detect the second input in the second mode MD2. In the second mode MD2, the sensor controller 200C may detect the second input in units of input detection frames. Hereinafter, for convenience of description, the input detection frame in the second mode MD2 is referred to as a finger input detection frame. In FIG. 10, four finger input detection frames IF2_1 to IF2_4 are illustrated as an example.

Each of the four finger input detection frames IF2_1 to IF2_4 has a specified section width. The sensor controller 200C may operate at a frequency of 60 Hz to 480 Hz. For example, when the sensor controller 200C operates at a frequency of 60 Hz, each of the finger input detection frames IF2_1 to IF2_4 has a section width of approximately 16.66 ms. When the sensor controller 200C operates at a frequency of 240 Hz, each of the finger input detection frames IF2_1 to IF2_4 has a section width of approximately 4.16 ms. However, the operating frequency of the sensor controller 200C is not particularly limited thereto, and various frequencies other than 60 Hz and 240 Hz may be applied.

Each of the finger input detection frames IF2_1 to IF2_4 may include the second search section DTP2 and the detection section FSP. The detection section FSP may be generated after the second search section DTP2. During the second search section DTP2, the sensor controller 200C may transmit the plurality of search signals to the input sensor 200. The plurality of search signals may include two or more search signals capable of communicating through two or more different protocols, respectively. As an example of the present disclosure, the plurality of search signals may include three search signals capable of communicating through three different protocols, respectively. Hereinafter, the three search signals are referred to as the first search signal ULS1, the second search signal ULS2, and the third search signal ULS3, respectively. Each of the first to third search signals ULS1 to ULS3 may be the upward search signal transmitted from the electronic device 1000 to the input device 2000 through the input sensor 200.

As an example of the present disclosure, the first search signal ULS1 is a signal capable of communicating through the first protocol, the second search signal ULS2 is a signal capable of communicating through the second protocol, and the third search signal ULS3 is a signal capable of communicating through the third protocol. The first to third protocols may be different protocols. For example, the first protocol may be the Microsoft Pen Protocol (MPP), the second protocol may be the Active ElectroStatic (AES) protocol of Wacom company, and the third protocol may be the Universal Stylus Initiative (USI) pen protocol. In FIG. 10, only three search signals are disclosed, but embodiments according to the present disclosure are not limited thereto. For example, the plurality of search signals may further include a signal capable of communicating with a protocol other than the above-described protocols.

The second search section DTP2 may have a section width less than the first search section DTP1 of each of the pen input detection frames IF1_1 to IF1_4 illustrated in FIG. 7. The second search section DTP2 may include a fourth uplink section ULP4 and a fifth uplink section ULP5. The fourth and fifth uplink sections ULP4 and ULP5 are sequentially arranged on a time axis and do not overlap each other on the time axis. For example, the fifth uplink section ULP5 may be generated after the fourth uplink section ULP4.

During the second search section DTP2 of each of the finger input detection frames IF2_1 to IF2_3, the electronic device 1000 may output two search signals among the first to third search signals ULS1 to ULS3. The sensor controller 200C may determine the priority of the first to third search signals ULS1 to ULS3, and may select two search signals from the first to third search signals ULS1 to ULS3, based on the determined priority.

As an example of the present disclosure, the sensor controller 200C may output the first search signal ULS1 during the fourth uplink section ULP4 of the first finger input detection frame IF2_1, and may output the second search signal ULS2 during the fifth uplink section ULP5 of the first finger input detection frame IF2_1. The sensor controller 200C may output the second search signal ULS2 during the fourth uplink section ULP4 of the second finger input detection frame IF2_2, and may output the third search signal ULS3 during the fifth uplink section ULP5 of the second finger input detection frame IF2_2. In addition, the sensor controller 200C may output the third search signal ULS3 during the fourth uplink section ULP4 of the third finger input detection frame IF2_3, and may output the first search signal ULS1 during the fifth uplink section ULP5 of the third finger input detection frame IF2_3. The sensor controller 200C may output the first search signal ULS1 during the fourth uplink section ULP4 of the fourth finger input detection frame IF2_4, and may output the second search signal ULS2 during the fifth uplink section ULP5 of the fourth finger input detection frame IF2_4.

When the plurality of the search signals include three search signals, the sensor controller 200C may output the first to third search signals ULS1 to ULS3 in the order of the first, the second, the second, the third, the third, and the first search signals ULS1, ULS2, ULS2, ULS3, ULS3, and ULS1 during three consecutive finger input detection frames IF2_1 to IF2_3. However, the order of outputting the first to third search signals ULS1 to ULS3 is not limited thereto and may be changed in various types. For example, the sensor controller 200C may output the first to third search signals ULS1 to ULS3 in the order of the first, the second, the third, the first, the second, and the third search signals ULS1, ULS2, ULS3, ULS1, ULS2, and ULS3 during three consecutive finger input detection frames IF2_1 to IF2_3.

FIG. 10 illustrates a case in which the second search section DTP2 includes two uplink sections, embodiments according to the present disclosure are not limited thereto. For example, the number of uplink sections included in the second search section DTP2 may vary depending on the section width of each finger input detection frame. For example, when the section width of each finger input detection frame decreases, the second search section DTP2 may include one uplink section. In contrast, when the section width of each finger input detection frame increases, the second search section DTP2 may include the same number of uplink sections as the number of uplink sections included in the first search section DTP1.

The second search section DTP2 may further include the response section. The response section may include a fourth response section AP4 and a fifth response section AP5. The fourth response section AP4 is placed between the fourth uplink section ULP4 and the fifth uplink section ULP5, and the fifth response section AP5 is placed between the fifth uplink section ULP5 and the detection section FSP. The fourth and fifth response sections AP4 and AP5 do not overlap each other on a time axis, and do not overlap with the fourth and fifth uplink sections ULP4 and ULP5 on a time axis.

During the fourth response section AP4, the sensor controller 200C receives the response signal to the search signal output during the fourth uplink section ULP4 or waits for reception of the response signal. During the fifth response section AP5, the sensor controller 200C receives the response signal to the search signal output during the fifth uplink section ULP5 or waits for reception of the response signal. In this case, the response signal associated with the first search signal ULS1 is referred to as a first response signal, the response signal associated with the second search signal ULS2 is referred to as the second response signal AS2, and the response signal associated with the third search signal ULS3 is referred to as the third response signal AS3.

In the first finger input detection frame IF2_1, the sensor controller 200C may not receive the response signal associated with the first and second search signals ULS1 and ULS2. In this case, the sensor controller 200C may detect the second input through the input sensor 200 during the detection section FSP of the first finger input detection frame IF2_1.

In the second finger input detection frame IF2_2, the sensor controller 200C may not receive the response signal associated with the second and third search signals ULS2 and ULS3. In this case, the sensor controller 200C may detect the second input through the input sensor 200 during the detection section FSP of the second finger input detection frame IF2_2.

In the third finger input detection frame IF2_3, the sensor controller 200C may not receive the response signal associated with the third and first search signals ULS3 and ULS1. In this case, the sensor controller 200C may detect the second input through the input sensor 200 during the detection section FSP of the third finger input detection frame IF2_3.

In the fourth finger input detection frame IF2_4, the sensor controller 200C may receive the second response signal AS2 associated with the second search signal ULS2 of the first and second search signals ULS1 and ULS2. In this case, the detection section FSP of the fourth finger input detection frame IF2_4 may include a downlink section DLP of receiving the downlink signal DLS from the input device 2000 providing the second response signal AS2. Therefore, during the downlink section DLP of the fourth finger input detection frame IF2_4, the sensor controller 200C may detect the first input through the input sensor 200.

After the first input is detected, the sensor controller 200C may determine whether to enter the first mode MD1. When the first mode MD1 is entered, the sensor controller 200C may terminate the operation in the second mode MD2 and may operate in the first mode MD1 as illustrated in FIG. 7. However, when the first mode MD1 is not entered, the sensor controller 200C may continue to operate in the second mode MD2.

As described above, because each of the finger input detection frames IF2_1 to IF2_4 in the second mode MD2 includes the second search section DTP2, the sensor controller 200C may periodically search for the existence of the input devices 2000#1 to 2000#3 (refer to FIGS. 8A to 8C) of various protocol types even in the second mode MD2.

Figure 11:
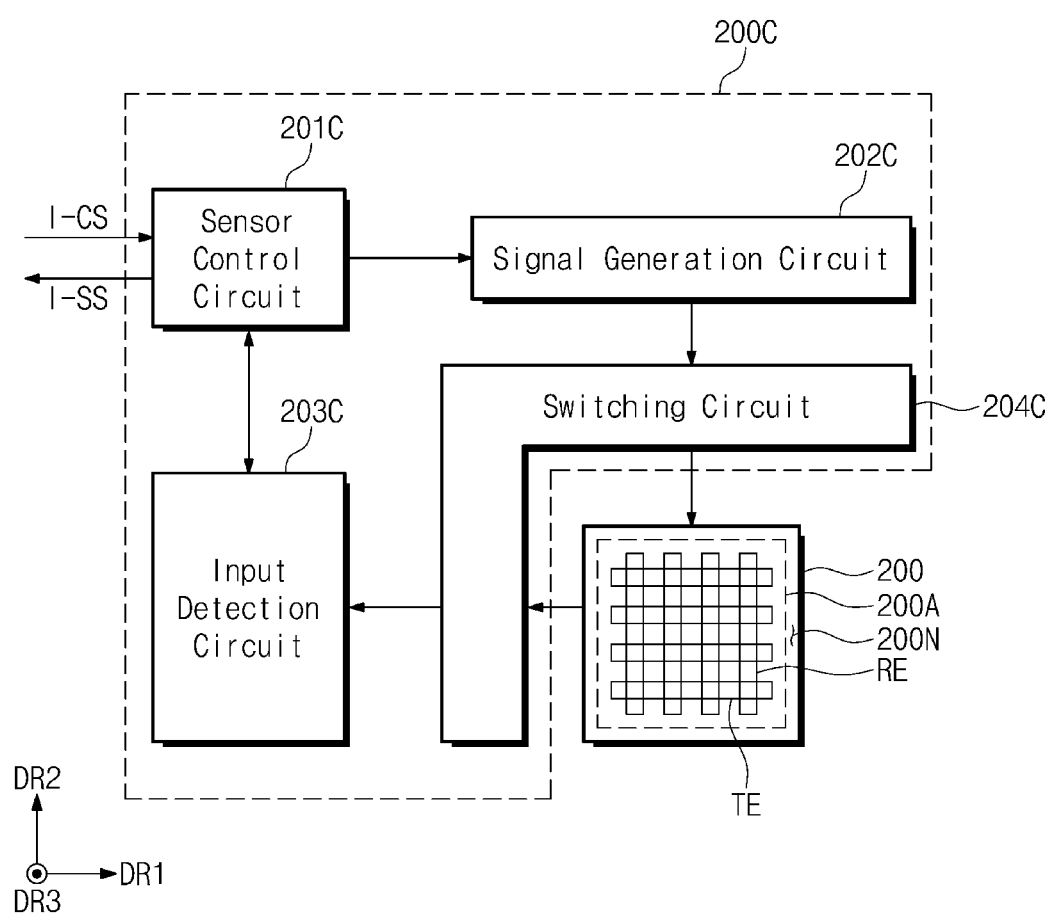
FIG. 11 is a block diagram of an input sensor and a sensor controller according to some embodiments of the present disclosure.
Figure 12A:
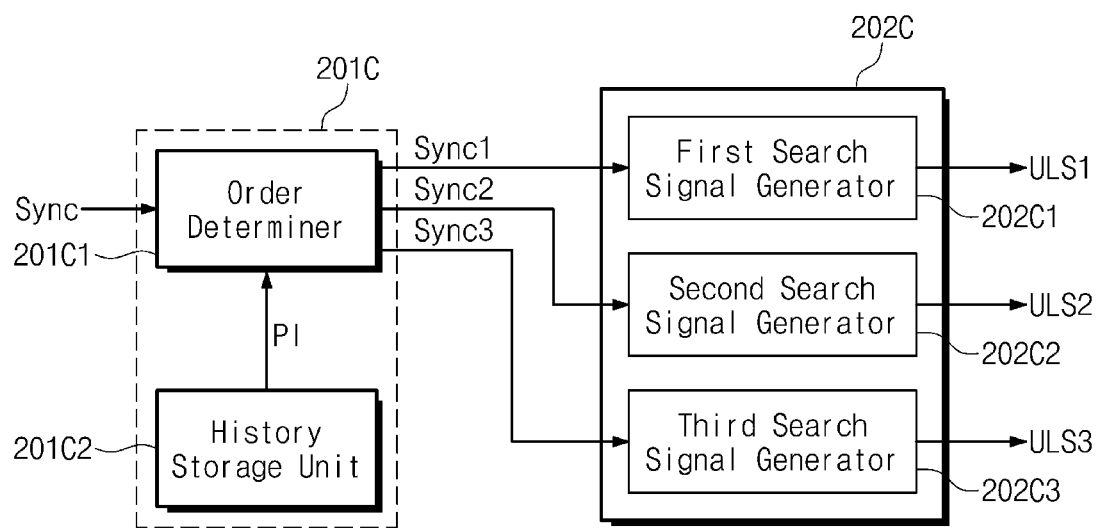
FIG. 12A is an internal block diagram of a signal generation circuit illustrated in FIG. 11 according to some embodiments of the present disclosure.
Figure 12B:
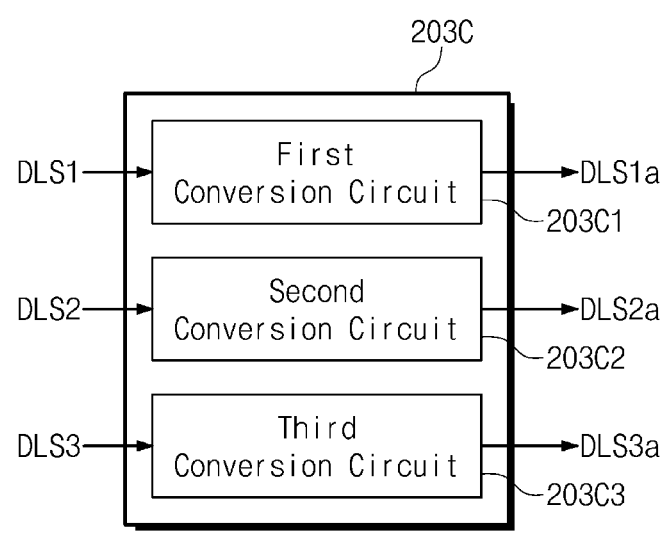
FIG. 12B is an internal block diagram of the input detection circuit illustrated in FIG. 11 according to some embodiments of the present disclosure.

FIG. 11 is a block diagram of an input sensor and a sensor controller according to some embodiments of the present disclosure. FIG. 12A is an internal block diagram of a signal generation circuit illustrated in FIG. 11, and FIG. 12B is an internal block diagram of an input detection circuit illustrated in FIG. 11.

Referring to FIG. 11, a detection area 200A and a non-detection area 200N may be defined in the input sensor 200. The detection area 200A may be an area activated depending on an electrical signal. For example, the detection area 200A may be an area detecting an input. The detection area 200A may overlap the active area AA1 (refer to FIG. 1) of the electronic device 1000 (refer to FIG. 1). The non-detection area 200N may surround the detection area 200A. The non-detection area 200N may overlap the peripheral area NAA1 (refer to FIG. 1) of the electronic device 1000.

The input sensor 200 may include a plurality of transmission electrodes TE and a plurality of reception electrodes RE. Each of the plurality of transmission electrodes TE extends along the first direction DR1, and the plurality of transmission electrodes TE may be arranged to be spaced apart from one another in the second direction DR2. Each of the plurality of reception electrodes RE extends along the second direction DR2, and the plurality of reception electrodes RE may be arranged to be spaced apart from one another in the first direction DR1.

The plurality of reception electrodes RE may cross the plurality of transmission electrodes TE that are insulated from the plurality of reception electrodes RE. Each of the plurality of transmission electrodes TE and the plurality of reception electrodes RE may have a bar shape or a stripe shape. When the plurality of transmission electrodes TE and the plurality of reception electrodes RE have the bar shape or the stripe shape, detecting characteristics of a continuous linear input that is provided through the input device 2000 (refer to FIG. 3) may be improved. However, the shape of each of the plurality of transmission electrodes TE and the plurality of reception electrodes RE is not limited to the bar shape or the stripe shape.

The sensor controller 200C may receive the sensing control signal I-CS from the main controller 1000C (refer to FIG. 3) and may provide the coordinate signal I-SS to the main controller 1000C.

The sensor controller 200C may include a sensor control circuit 201C, a signal generation circuit 202C, an input detection circuit 203C, and a switching circuit 204C. The sensor control circuit 201C, the signal generation circuit 202C, and the input detection circuit 203C may be implemented in a single chip, or some of the sensor control circuit 201C, the signal generation circuit 202C, and the input detection circuit 203C and some other parts may be implemented in different chips.

The sensor control circuit 201C may control an operation of the signal generation circuit 202C and the switching circuit 204C, and may calculate coordinates of the second input from a driving signal received from the input detection circuit 203C, or may analyze information transmitted by the input device 2000 from a modulated signal received from the input detection circuit 203C.

The signal generation circuit 202C may provide a transmission signal or the search signal to the input sensor 200. The signal generation circuit 202C may output the search signal to the input sensor 200 in the first mode, and may output the search signal and the transmission signal to the input sensor 200 in the second mode.

Referring to FIG. 12A, the plurality of search signals may include the first to third search signals ULS1, ULS2, and ULS3. The first to third search signals ULS1, ULS2, and ULS3 may be signals capable of communicating through different protocols.

The signal generation circuit 202C may include a first search signal generator 202C1, a second search signal generator 202C2, and a third search signal generator 202C3. The first search signal generator 202C1 generates the first search signal ULS1 capable of communicating through the first protocol, the second search signal generator 202C2 generates the second search signal ULS2 capable of communicating through the second protocol, and the third search signal generator 202C3 generates the third search signal ULS3 capable of communicating through the third protocol.

When the plurality of search signals include four search signals, the signal generation circuit 202C may include four search signal generators. In addition, at least two of the first to third search signal generators 202C1, 202C2, and 202C3 may be integrated into one search signal generator. In this case, two search signals capable of communicating through two different protocols, respectively may be output from the one integrated search signal generator.

Timings at which the first to third search signal generators 202C1, 202C2, and 202C3 output the first to third search signals ULS1, ULS2, and ULS3 may be different from one another. To determine an output order of the first to third search signals ULS1, ULS2, and ULS3, the sensor control circuit 201C may include an order determiner 201C1 and a history storage unit 201C2.

The sensor control circuit 201C may receive a vertical synchronization signal from the main controller 1000C (refer to FIG. 3) and may generate a detection synchronization signal Sync, based on the vertical synchronization signal.

The order determiner 201C1 may generate a first detection synchronization signal Sync1, a second detection synchronization signal Sync2, and a third detection synchronization signal Sync3, based on the detection synchronization signal Sync. The first detection synchronization signal Sync1 may be provided to the first search signal generator 202C1 to determine an output timing of the first search signal ULS1. The second detection synchronization signal Sync2 may be provided to the second search signal generator 202C2 to determine an output timing of the second search signal ULS2. The third detection synchronization signal Sync3 may be provided to the third search signal generator 202C3 to determine an output timing of the third search signal ULS3.

When the order determiner 201C1 generates the first to third detection synchronization signals Sync1, Sync2, and Sync3, the order determiner 201C1 may refer to protocol information PI. The protocol information PI is stored in the history storage unit 201C2 and may be periodically updated. The order determiner 201C1 loads the protocol information PI from the history storage unit 201C2, and then generates the first to third detection synchronization signals Sync1, Sync2, and Sync3, based on the protocol information PI.

As the timings of outputting the first to third search signals ULS1, ULS2, and ULS3 by the first to third detection synchronization signals Sync1, Sync2, and Sync3 are changed, the order of outputting the first to third search signals ULS1, ULS2, and ULS3 may be determined by the order determiner 201C1.

Referring to FIGS. 11 and 12B, the input detection circuit 203C may receive a reception signal or the downlink signal from the input sensor 200. The input detection circuit 203C may filter a reception signal or the downlink signal, or may convert the signal into a signal that may be processed by the sensor control circuit 201C and may provide the converted signal to the sensor control circuit 201C.

As an example of the present disclosure, the input detection circuit 203C may include a first conversion circuit 203C1, a second conversion circuit 203C2, and a third conversion circuit 203C3. The first conversion circuit 203C1 may convert the first downlink signal DLS1 into a signal DLS1a that may be processed by the sensor control circuit 201C. In this case, the first downlink signal DLS1 may be defined as a signal that is transmitted from the input device capable of communicating through the first protocol. The second conversion circuit 203C2 may convert the second downlink signal DLS2 into a signal DLS2a that may be processed by the sensor control circuit 201C. In this case, the second downlink signal DLS2 may be defined as a signal that is transmitted from the input device capable of communicating through the second protocol. The third conversion circuit 203C3 may convert the third downlink signal DLS3 into a signal DLS3a that may be processed by the sensor control circuit 201C. In this case, the third downlink signal DLS3 may be defined as a signal that is transmitted from the input device capable of communicating through the third protocol. When the plurality of search signals include four search signals, the input detection circuit 203C may include four conversion circuits.

The switching circuit 204C may selectively switch an electrical connection relationship between the input sensor 200 and the signal generation circuit 202C and/or between the input sensor 200 and the input detection circuit 203C under a control of the sensor control circuit 201C. The switching circuit 204C may connect any one group of the plurality of transmission electrodes TE and the plurality of reception electrodes RE to the signal generation circuit 202C under the control of the sensor control circuit 201C, or may connect each of the plurality of transmission electrodes TE and the plurality of reception electrodes RE to the signal generation circuit 202C under the control of the sensor control circuit 201C. Alternatively, the switching circuit 204C may connect any one group or both of the plurality of transmission electrodes TE and the plurality of reception electrodes RE to the input detection circuit 203C.

Figure 13:
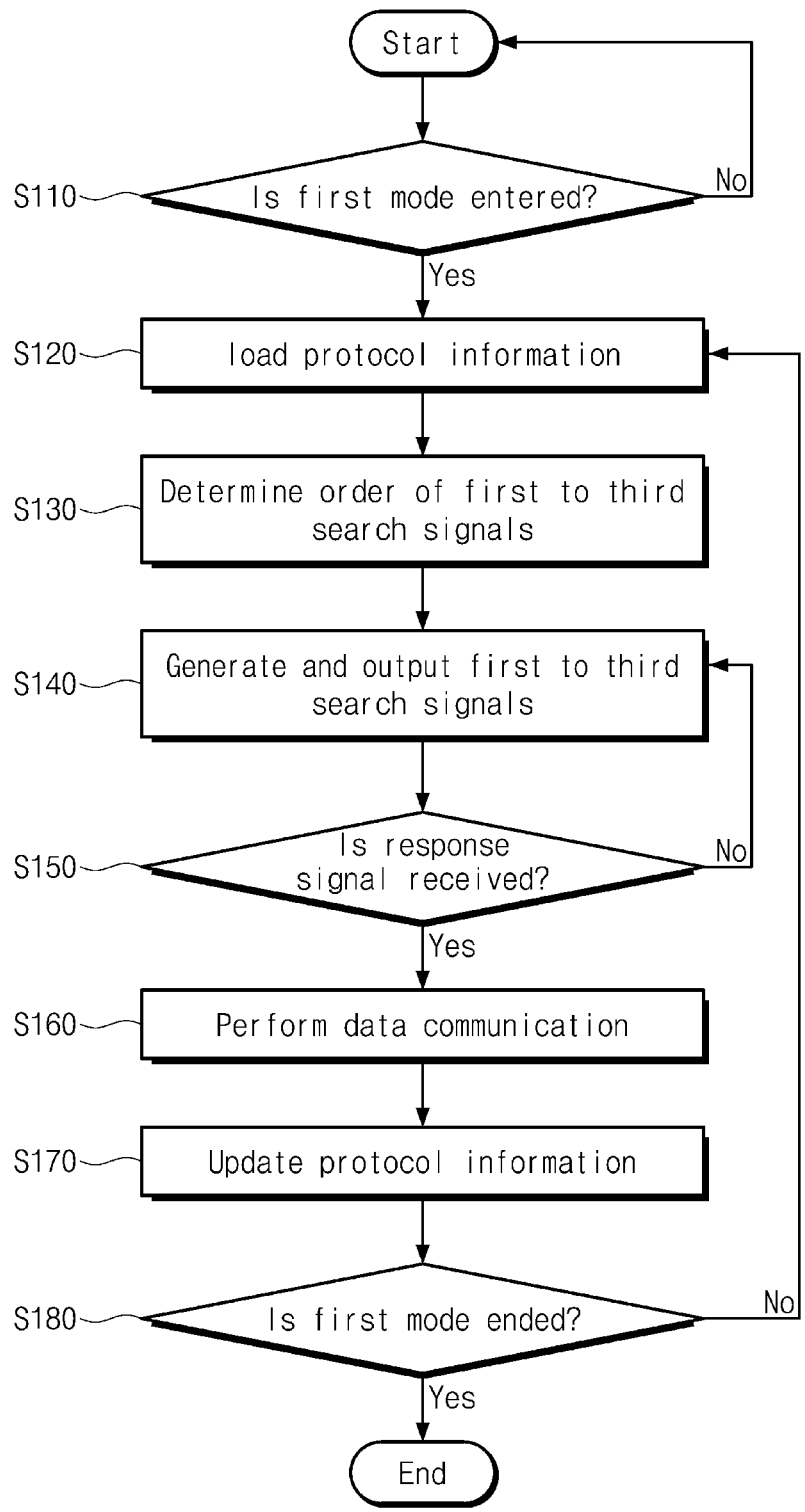
FIG. 13 is a flowchart describing an operation of an electronic device in a first mode according to some embodiments of the present disclosure.
Figure 14:
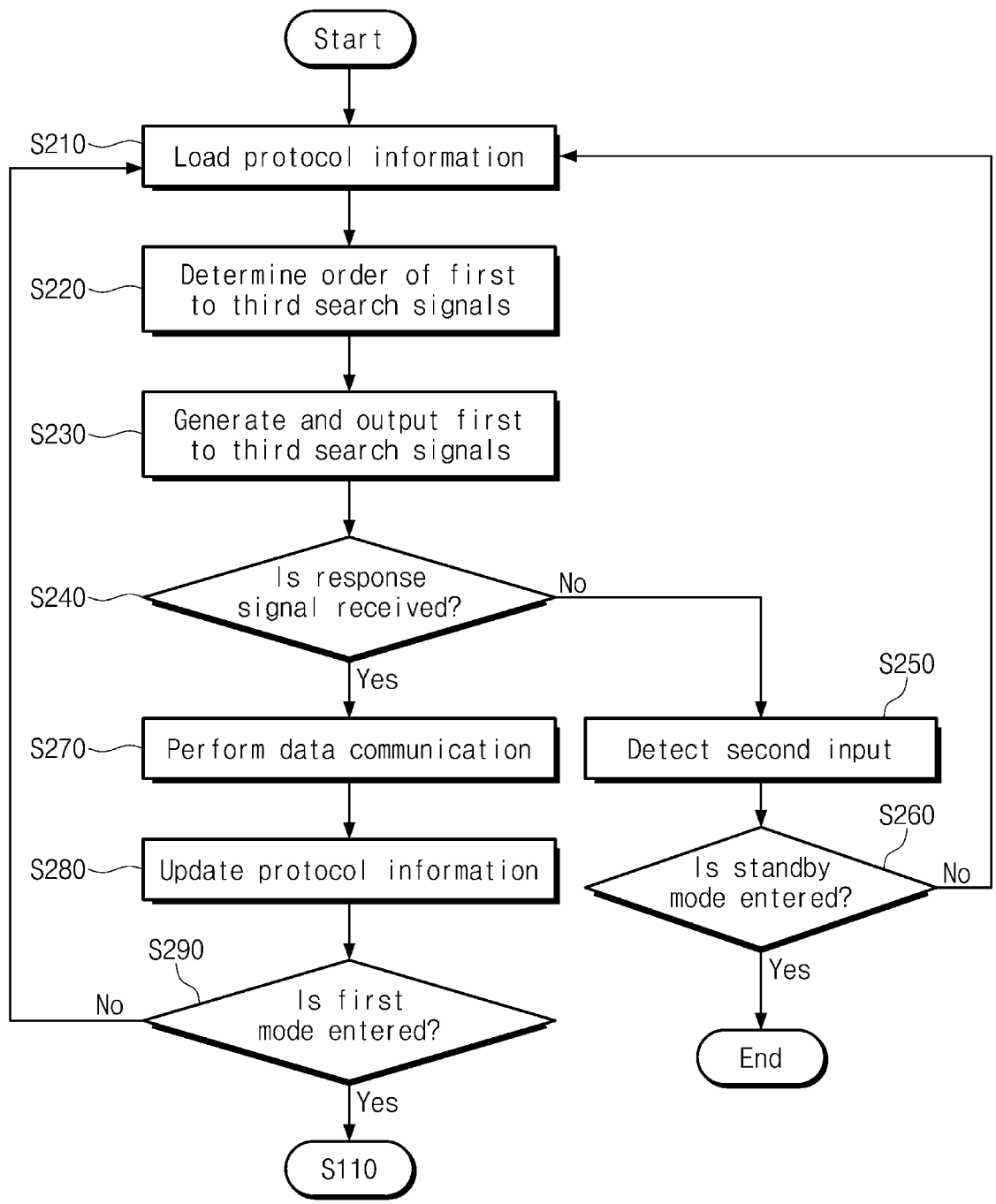
FIG. 14 is a flowchart describing an operation of an electronic device in a second mode according to some embodiments of the present disclosure.

FIG. 13 is a flowchart describing an operation of an electronic device in a first mode according to some embodiments of the present disclosure, and FIG. 14 is a flowchart describing an operation of an electronic device in a second mode according to some embodiments of the present disclosure.

Referring to FIGS. 3, 12A, and 13, the sensor controller 200C determines whether to enter the first mode that detects the first input by the input device 2000 (S110). When the first mode is not entered, the sensor controller 200C does not operate in the first mode. However, when it is determined to enter the first mode, the sensor controller 200C loads the protocol information PI from the history storage unit 201C2 to determine the order of the first to third search signals ULS1, ULS2, and ULS3 (S120).

The order determiner 201C1 of the sensor controller 200C determines an output order of the first to third search signals ULS1, ULS2, and ULS3, based on the protocol information PI (S130). The first to third search signals ULS1, ULS2, and ULS3 may be signals capable of communicating through the first to third protocols, respectively. The protocol information may include information associated with a protocol supported by the input device that performs data communication with the sensor controller 200C most recently, or may include information associated with the number of actual data communication performed for each of the first to third protocols.

The signal generation circuit 202C of the sensor controller 200C generates the first to third search signals ULS1, ULS2, and ULS3 (S140). The signal generation circuit 202C may output the first to third search signals ULS1, ULS2, and ULS3 at different times with one another in response to the first to third detection synchronization signals Sync1, Sync2, and Sync3 provided from the order determiner 201C1.

The sensor controller 200C waits for the response signal associated with each of the first to third search signals ULS1, ULS2, and ULS3 (S150). When the response signal is not received, the first to third search signals ULS1, ULS2, and ULS3 are generated without changing the output order of the first to third search signals ULS1, ULS2, and ULS3 (S140). When the response signal is received, data communication is performed with the input device that transmits the response signal (S160).

When data communication between the sensor controller 200C and the input device is terminated, the protocol information PI may be updated (S170). For example, the protocol information PI is updated with a protocol that is supported by the input device performing data communication. For example, when data communication is performed with the input device supporting the third protocol, the protocol information PI may include information on the third protocol.

When the update is terminated, it is determined whether to end the first mode (S180). When it is determined to continue operating in the first mode, the sensor controller 200C may load the updated protocol information PI to change the order of the first to third search signals ULS1, ULS2, and ULS3. However, when it is determined not to operate in the first mode, the first mode may be ended.

Referring to FIGS. 3, 12A, and 14, when the first mode is terminated, the second mode may be activated. The sensor controller 200C may operate to detect the second input in the second mode. When the operation of the second mode is started, the sensor controller 200C loads the protocol information PI from the history storage unit 201C2 to determine the order of the first to third search signals ULS1, ULS2, and ULS3 (S210).

The order determiner 201C1 of the sensor controller 200C determines the output order of the first to third search signals ULS1, ULS2, and ULS3, based on the protocol information PI (S220).

The signal generation circuit 202C of the sensor controller 200C generates the first to third search signals ULS1, ULS2, and ULS3 (S230). The signal generation circuit 202C may output the first to third search signals ULS1, ULS2, and ULS3 at different times with one another in response to the first to third detection synchronization signals Sync1, Sync2, and Sync3 that are provided from the order determiner 201C1.

The sensor controller 200C waits for the response signal associated with each of the first to third search signals ULS1, ULS2, and ULS3 (S240). When the response signal is not received, the sensor controller 200C detects the second input (S250). The sensor controller 200C may provide the transmission signal for detecting the second input to the input sensor 200 and then may generate coordinate information for the second input, based on a received signal provided from the input sensor 200.

When the detection of the second input ends, it is determined whether to enter a standby mode (S260). The standby mode may be defined as a sleep state in which the sensor controller 200C is not activated in the first mode and the second mode. When the standby mode is entered, the second mode may be terminated. However, when the standby mode is not entered, the sensor controller 200C may continue to operate in the second mode.

When the response signal is received, the sensor controller 200C performs data communication with the input device that transmits the response signal (S270).

When data communication between the sensor controller 200C and the input device is terminated, the protocol information PI may be updated (S280). For example, the protocol information PI is updated with a protocol supported by the input device that performs data communication. For example, when data communication is performed with the input device supporting the third protocol, the protocol information PI may include information on the third protocol.

When the update is terminated, it is determined whether to enter the first mode (S290). When the first mode is entered, the sensor controller 200C may move to operation S120 to operate in the first mode. However, when the first mode is not entered, the sensor controller 200C may move to operation S210 to continue operating in the second mode.

As a plurality of search signals capable of communicating through different protocols in the first mode and the second mode are output, it may be possible to search for access of various types of input devices.

According to some embodiments of the present disclosure, as an electronic device outputs a plurality of search signals capable of communicating through different protocols with one another during a search section of an input detection frame, the electronic device may search for access of various types of input devices.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

While aspects of some embodiments of the present disclosure have been described with reference to embodiments thereof, it will be apparent to those of ordinary skill in the art that various changes and modifications may be made thereto without departing from the spirit and scope of the present disclosure as set forth in the following claims, and their equivalents.

What is claimed is:

1. An electronic device comprising:
a display panel configured to display an image;
an input sensor on the display panel; and
a sensor controller configured to detect a first input by at least one of a plurality of input devices through the input sensor, and
wherein the sensor controller is configured to detect the first input during an input detection frame,
wherein the input detection frame includes a search section in which a plurality of search signals are provided to the input sensor, and
wherein the plurality of search signals include two or more search signals capable of communicating through two or more different protocols, respectively, the sensor controller determines a priority of the plurality of search signals and varies output timings of the plurality of search signals based on the priority.

2. The electronic device of claim 1, wherein the plurality of search signals include:
a first search signal capable of communicating through a first protocol; and
a second search signal capable of communicating through a second protocol different from the first protocol.

3. The electronic device of claim 2, wherein the search section includes:
a first uplink section during which the first search signal is provided to the input sensor; and
a second uplink section during which the second search signal is provided to the input sensor, and
wherein the first uplink section and the second uplink section do not overlap each other on a time axis.

4. The electronic device of claim 3, wherein the search section further includes:
a first response section following the first uplink section for receiving a first response signal to the first search signal or waiting for a reception of the first response signal; and
a second response section following the second uplink section for receiving a second response signal to the second search signal or waiting for a reception of the second response signal, and
wherein the first response section does not overlap with the second uplink section, and the second response section does not overlap with the first uplink section.

5. The electronic device of claim 4, wherein the input detection frame further includes:
a communication section following the search section for detecting the first input from the input devices.

6. The electronic device of claim 5, wherein, in response to the first response signal being received during the first response section and the second response signal not being received during the second response section, the communication section includes:
a downlink section in which data communication with a first input device supporting the first protocol among the input devices is performed.

7. The electronic device of claim 5, wherein, in response to the first response signal not being received during the first response section and the second response signal being received during the second response section, the communication section includes:
a downlink section in which data communication with a second input device supporting the second protocol among the input devices is performed.

8. The electronic device of claim 5, wherein, in response to the first response signal being received during the first response section and the second response signal being received during the second response section, the communication section includes:
a first downlink section in which data communication with a first input device supporting the first protocol among the input devices is performed; and
a second downlink section in which data communication with a second input device supporting the second protocol among the input devices is performed.

9. The electronic device of claim 8, wherein the first downlink section and the second downlink section do not overlap each other on a time axis.

10. The electronic device of claim 2, wherein the sensor controller includes:
a sensor control circuit configured to generate a first detection synchronization signal and a second detection synchronization signal; and
a signal generation circuit configured to generate the first search signal and the second search signal, and to vary output timing of the first search signal and the second search signal depending on the first detection synchronization signal and the second detection synchronization signal.

11. The electronic device of claim 10, wherein the sensor control circuit includes:
a history storage unit configured to store protocol information on data communication performed with the input devices; and
an order determiner configured to determine an order of the first search signal and the second search signal, based on the protocol information.

12. The electronic device of claim 11, wherein the protocol information includes:
information associated with a protocol on data communication that is the most recently performed with the input device.

13. The electronic device of claim 10, wherein the signal generation circuit includes:
a first search signal generator configured to generate the first search signal, and to vary an output timing of the first search signal in response to the first detection synchronization signal; and
a second search signal generator configured to generate the second search signal, and to vary an output timing of the second search signal in response to the second detection synchronization signal.

14. The electronic device of claim 1, wherein the sensor controller is configured to detect the first input through the input sensor in a first mode, and to detect the first input or a second input different from the first input through the input sensor in a second mode.

15. The electronic device of claim 14, wherein the plurality of search signals include:
a first search signal capable of communicating through a first protocol;
a second search signal capable of communicating through a second protocol different from the first protocol; and
a third search signal capable of communicating through a third protocol different from the first and second protocols.

16. The electronic device of claim 15, wherein the sensor controller is configured to provide the first to third search signals to the input sensor during a first search section of the input detection frame in the first mode, and
wherein, in the first mode, the input detection frame further includes a communication section following the first search section and for detecting the first input.

17. The electronic device of claim 16, wherein the first search section includes:
a first uplink section in which one of the first to third search signals is provided;
a second uplink section in which another of the first to third search signals is provided; and
a third uplink section in which the other of the first to third search signals is provided, and
wherein the first uplink section, the second uplink section, and the third uplink section do not overlap one another on a time axis.

18. The electronic device of claim 16, wherein the sensor controller is configured to provide at least one of the first to third search signals to the input sensor during a second search section of the input detection frame in the second mode, and
wherein, in the second mode, the input detection frame further includes a detection section following the second search section for detecting the second input.

19. The electronic device of claim 18, wherein the second search section includes:
a fourth uplink section in which one of the first to third search signals is provided;
a fifth uplink section in which another of the first to third search signals is provided, and
wherein the fourth uplink section and the fifth uplink section do not overlap each other on a time axis.

20. The electronic device of claim 18, wherein a width of the second search section is less than that of the first search section.

* * * * *